(12) United States Patent
Rao et al.

(10) Patent No.: US 11,838,048 B2
(45) Date of Patent: Dec. 5, 2023

(54) SD-FEC DEFECT PROPAGATION ACROSS REGENERATION NODES IN SUPPORT OF SINGLE AND MULTI-CARRIER SUPER CHANNEL PROTECTION IN ROADM NETWORKS

(71) Applicant: Infinera Corp., Annapolis Junction, MD (US)

(72) Inventors: Rajan Rao, Fremont, CA (US); Ramakrishna Pratapa, Bangalore (IN); Ramnarayan Srinivasan, Bangalore (IN); Ashok Kunjidhapatham, Devarachikkanahalli (IN); Radhakrishna Valiveti, Union City, CA (US)

(73) Assignee: Infinera Corporation, San Jose, CA (US)

( * ) Notice: Subject to any disclaimer, the term of this patent is extended or adjusted under 35 U.S.C. 154(b) by 0 days.

(21) Appl. No.: 16/998,159

(22) Filed: Aug. 20, 2020

(65) Prior Publication Data

US 2021/0226697 A1 Jul. 22, 2021

Related U.S. Application Data

(60) Provisional application No. 63/000,449, filed on Mar. 26, 2020, provisional application No. 62/962,385, filed on Jan. 17, 2020.

(51) Int. Cl.
*H04B 10/032* (2013.01)
*H04B 10/075* (2013.01)
*H04B 10/29* (2013.01)

(52) U.S. Cl.
CPC ......... *H04B 10/032* (2013.01); *H04B 10/075* (2013.01); *H04B 10/29* (2013.01)

(58) Field of Classification Search
None
See application file for complete search history.

(56) References Cited

U.S. PATENT DOCUMENTS 6,829,741 B1 * 12/2004 Khansari ............... H04L 1/0083
714/701
9,258,215 B2 * 2/2016 Hussain .................. H04L 1/007
(Continued)

OTHER PUBLICATIONS

Minoli, Daniel, Telecommunications Technology Handbook, 2003, Second Edition, Artech House (Year: 2003).*
(Continued)

*Primary Examiner* — Jai M Lee
(74) *Attorney, Agent, or Firm* — David L. Soltz

(57) ABSTRACT

A regen node is described. The regen node includes a coherent receiver, a control module and a coherent transmitter. The coherent receiver has circuitry to convert a first optical signal received from an upstream node in an optical layer of an optical network to a first digital data stream in a digital layer having a first FEC frame and a data traffic. The control module extracts a first fault signal from the first FEC frame; generates a second fault signal based at least in part on the first fault signal; and encodes the second fault signal within a second FEC frame with the data traffic into a second digital data stream on the digital layer. The coherent transmitter has circuitry to convert the second digital data stream into a second optical signal on the optical layer and to transmit the second optical signal to a downstream node.

15 Claims, 14 Drawing Sheets

(56) References Cited

U.S. PATENT DOCUMENTS

| | | | |
|---|---|---|---|
| 10,063,313 B1* | 8/2018 | Al Sayeed | H04J 14/029 |
| 10,193,658 B2* | 1/2019 | Buchali | H04L 1/0045 |
| 10,200,149 B2* | 2/2019 | Roberts | H03M 13/2906 |
| 10,205,534 B2* | 2/2019 | Mehrvar | H04B 10/25 |
| 10,749,628 B2* | 8/2020 | Nakada | H03M 13/2906 |
| 10,797,824 B2* | 10/2020 | Rao | H04Q 11/0001 |
| 2001/0021045 A1* | 9/2001 | Tervonen | H04B 10/07955 398/5 |
| 2001/0053225 A1* | 12/2001 | Ohira | H04L 1/0083 380/239 |
| 2002/0129313 A1* | 9/2002 | Kubo | H03M 13/6561 714/752 |
| 2003/0142678 A1* | 7/2003 | Chan | H04J 3/085 370/395.1 |
| 2003/0169470 A1* | 9/2003 | Alagar | H04J 14/0241 398/5 |
| 2003/0180074 A1* | 9/2003 | Noya | G03G 15/2064 399/328 |
| 2006/0127100 A1* | 6/2006 | Frankel | H04B 10/29 398/158 |
| 2007/0211742 A1* | 9/2007 | Trisno | H04L 45/28 370/463 |
| 2007/0211750 A1* | 9/2007 | Li | H04L 12/4625 370/445 |
| 2007/0292129 A1* | 12/2007 | Yan | H04J 14/0291 398/5 |
| 2008/0148127 A1* | 6/2008 | Miyata | H04L 1/0083 714/755 |
| 2009/0196602 A1* | 8/2009 | Saunders | H04B 10/5055 398/9 |
| 2010/0208583 A1* | 8/2010 | Liou | H04L 43/0811 370/225 |
| 2010/0287449 A1* | 11/2010 | Kubo | H04J 3/1652 714/775 |
| 2011/0135301 A1* | 6/2011 | Myslinski | H04J 14/0201 398/34 |
| 2011/0135312 A1* | 6/2011 | El-Ahmadi | H04J 3/1658 714/752 |
| 2011/0150469 A1* | 6/2011 | Nonaka | H04J 3/1652 398/52 |
| 2012/0051736 A1* | 3/2012 | Yan | H04J 3/1652 398/18 |
| 2012/0183303 A1* | 7/2012 | Onohara | H04B 10/614 398/136 |
| 2012/0224846 A1* | 9/2012 | Swanson | H04B 10/85 398/13 |
| 2013/0243431 A1* | 9/2013 | Pointurier | H04J 14/0212 398/79 |
| 2015/0125141 A1* | 5/2015 | Hu | H04B 10/0793 398/5 |
| 2016/0080110 A1* | 3/2016 | Gareau | H04J 3/1652 398/66 |
| 2016/0315696 A1* | 10/2016 | Lee | H04Q 11/0005 |
| 2020/0382209 A1* | 12/2020 | Hou | H04J 3/14 |

OTHER PUBLICATIONS

Smith, Darrell, OTUK-Backward Defect Indicator, 2017 (Year: 2017).*

* cited by examiner

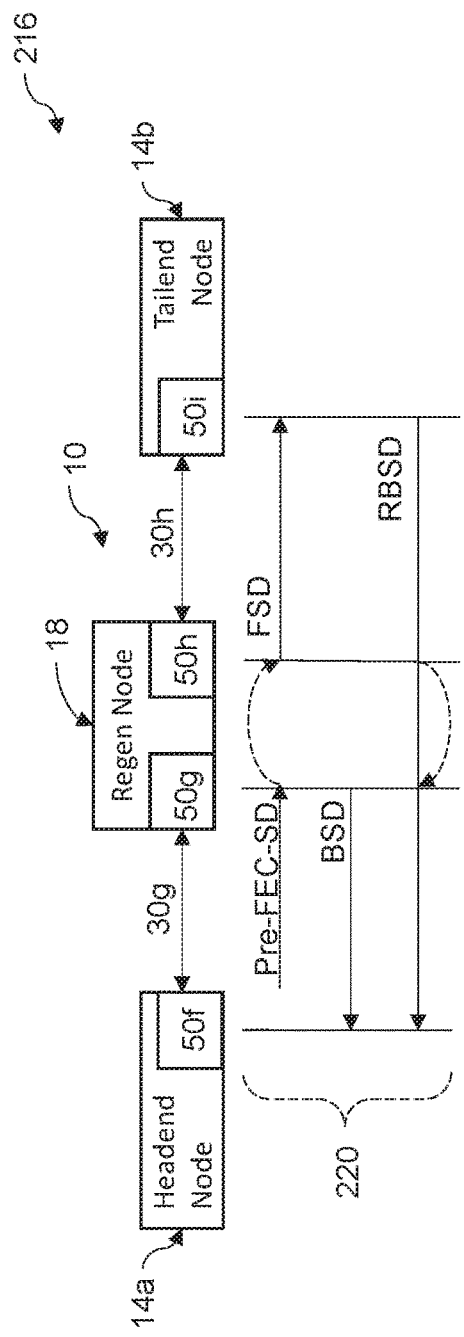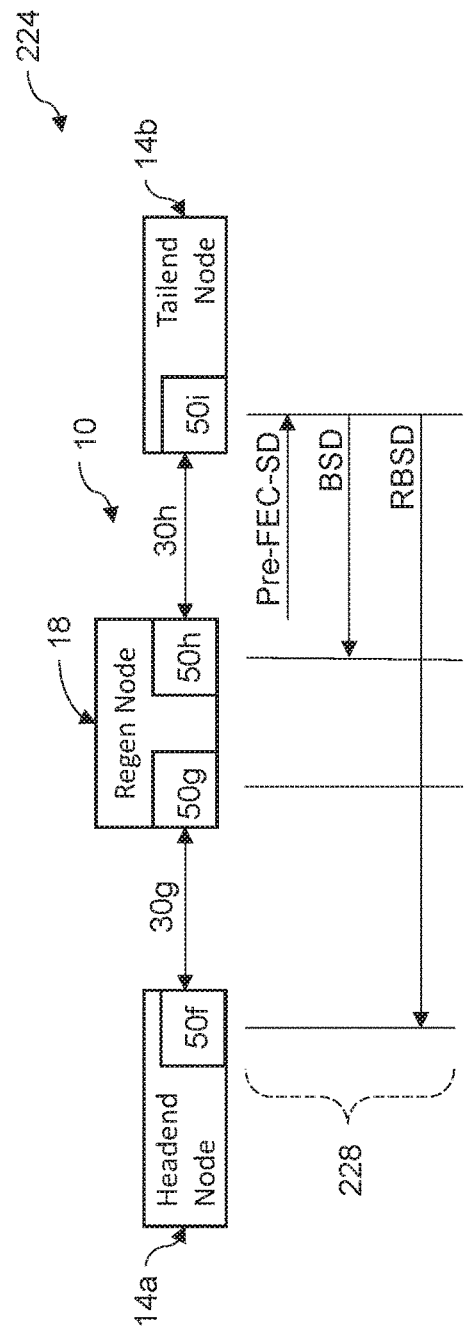

SD-FEC DEFECT PROPAGATION ACROSS REGENERATION NODES IN SUPPORT OF SINGLE AND MULTI-CARRIER SUPER CHANNEL PROTECTION IN ROADM NETWORKS

INCORPORATION BY REFERENCE

The present patent application claims priority to Provisional Patent Application U.S. Ser. No. 62/962,835 titled "SD-FEC Defect Propagation Across Regeneration Nodes In Support Of Single And Multi-Carrier Super Channel Protection In ROADM Networks", filed on Jan. 17, 2020 and U.S. Ser. No. 63/000,449 titled "SD-FEC Defect Propagation Across Regeneration Nodes In Support Of Single And Multi-Carrier Super Channel Protection In ROADM Networks", filed on Mar. 26, 2020, the entire contents of which are hereby expressly incorporated herein by reference.

BACKGROUND

Optical networking is a communication means that utilizes signals encoded in light to transmit information in various types of telecommunications networks. Optical networking may be used in relatively short-range networking applications such as in a local area network (LAN) or in long-range networking applications spanning countries, continents, and oceans. Generally, optical networks utilize optical amplifiers, a light source such as lasers or LEDs, and wave division multiplexing to enable high-bandwidth, transcontinental communication.

Traffic Engineering (TE) is a technology that is concerned with performance optimization of operational networks. In general, Traffic Engineering includes a set of applications mechanisms, tools, and scientific principles that allow for measuring, modeling, characterizing and control of user data traffic in order to achieve specific performance objectives.

MPLS stands for multi-protocol label switching which is a scheme in telecommunications networks for carrying data from one node to the next node. MPLS operates at an OSI model layer that is generally considered to lie between traditional definitions of layer 2 (data link layer) and layer 3 (network layer) and is thus often referred to as a layer 2.5 protocol. Generalized Multiprotocol Label Switching (GMPLS) is a type of protocol which extends multiprotocol label switching to encompass network schemes based upon time-division multiplexing (e.g. SONET/SDH, PDH, G.709), wavelength multiplexing, and spatial switching (e.g. incoming port or fiber to outgoing port or fiber). The GMPLS framework includes a set of routing protocols which runs on a control module. The Generalized Multiprotocol Label Switching architecture is defined, for example in RFC 3945. Multiplexing, such as time-division multiplexing is when two or more signals or bit streams are transferred over a common channel.

GMPLS includes multiple types of label switched paths including recovery mechanisms (i.e., protection mechanisms and restoration mechanisms) which specifies predefined (1) working connections within a mesh network having multiple nodes and communication links for transmitting data between a headend node and a tailend node; and (2) protecting connections specifying a different group of nodes and/or communication links for transmitting data traffic between the headend node to the tailend node in the event that one or more of the working connections fail. Working connections may also be referred to as working paths. Protecting connections may also be referred to as recovery paths and/or protecting paths and/or protection paths. A first node of a path may be referred to as a headend node or a source node. A last node of a path may be referred to as a tailend node or end node or destination node. The headend node or tailend node initially selects to receive data over the working connection (such as an optical channel data unit label switched path) and then, when a working connection fails, the headend node or tailend node selects a protecting connection for passing data traffic within the mesh network. The set up and activation of the protecting connections may be referred to as restoration or protection.

Recovery at optical layer (L0 layer) provides an efficient mechanism through which data traffic transport can be offered a considerable degree of resiliency against failures in the network. The current state of the art implementations for optical recovery at L0 layer use faults generated in the optical layer to trigger the recovery in cases of failures. In some cases, local photo-diodes are monitored using optical loss of signal (OLOS) triggers harnessed as fast recovery triggers. Only for conditions where there is a complete OLOS defect detected in the power measured for an optical channel, can it be conclusively said that the channel is down. However, such an OLOS defect fails to identify faults in digital data traffic. For example, when a carrier fails and the super-channel is supplemented with ASE to maintain overall signal integrity, a downstream node will not identify the OLOS defect even though the super-channel has a failed carrier. Additionally, in cases of high accumulated noise in case of longer links especially with Raman amplifiers, OPM device measurements can conclude that there is a sufficient power on the optical channel even though it is not possible to extract the digital data traffic from the optical channel.

Another prior art mechanism which can be used as a trigger for L0 optical protection and/or restoration can be optical layer defect propagation faults (faults from the optical supervisory channel). Optical layer defect propagation (OLDP) is a fault propagation mechanism in the optical layer for operations and maintenance considerations to facilitate protection or restoration using overhead frames mapped to the optical supervisory channel. Prior teachings, however, fail to propagate optical layer defect faults across a regeneration node (regen node) where the optical layer is converted to a digital layer for processing of the digital data traffic, and then converted back to the optical layer.

Hence, the limitations identified above can be addressed by taking into account SDFEC defects and its propagation in optical networks containing one or more regeneration nodes.

SUMMARY

A method and system are disclosed. The problem of achieving optical layer recovery by SDFEC defect forwarding across regeneration nodes in optical networks is addressed by configuring a control module of the regeneration node(s) to extract a first fault signal indicative of a defect from an FEC frame within a first optical signal carrying data traffic traveling in a direction from an upstream node to a downstream node, generating a second fault signal based at least in part on the first fault signal; and encoding the second fault signal within a second FEC frame with the data traffic into a second digital data stream on the digital layer, and enabling a coherent transmitter to convert the second digital data stream into a second optical signal on the optical layer and to transmit the second optical signal to the downstream node.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings:

FIG. 7C is a diagram of an exemplary embodiment of a Carrier Pre-FEC-SD fault treatment scenario having a fault before a regen node.

FIG. 7D is a diagram of an exemplary embodiment of a Carrier Pre-FEC-SD fault treatment scenario having a fault before a terminal node.

DETAILED DESCRIPTION

Figure 1:
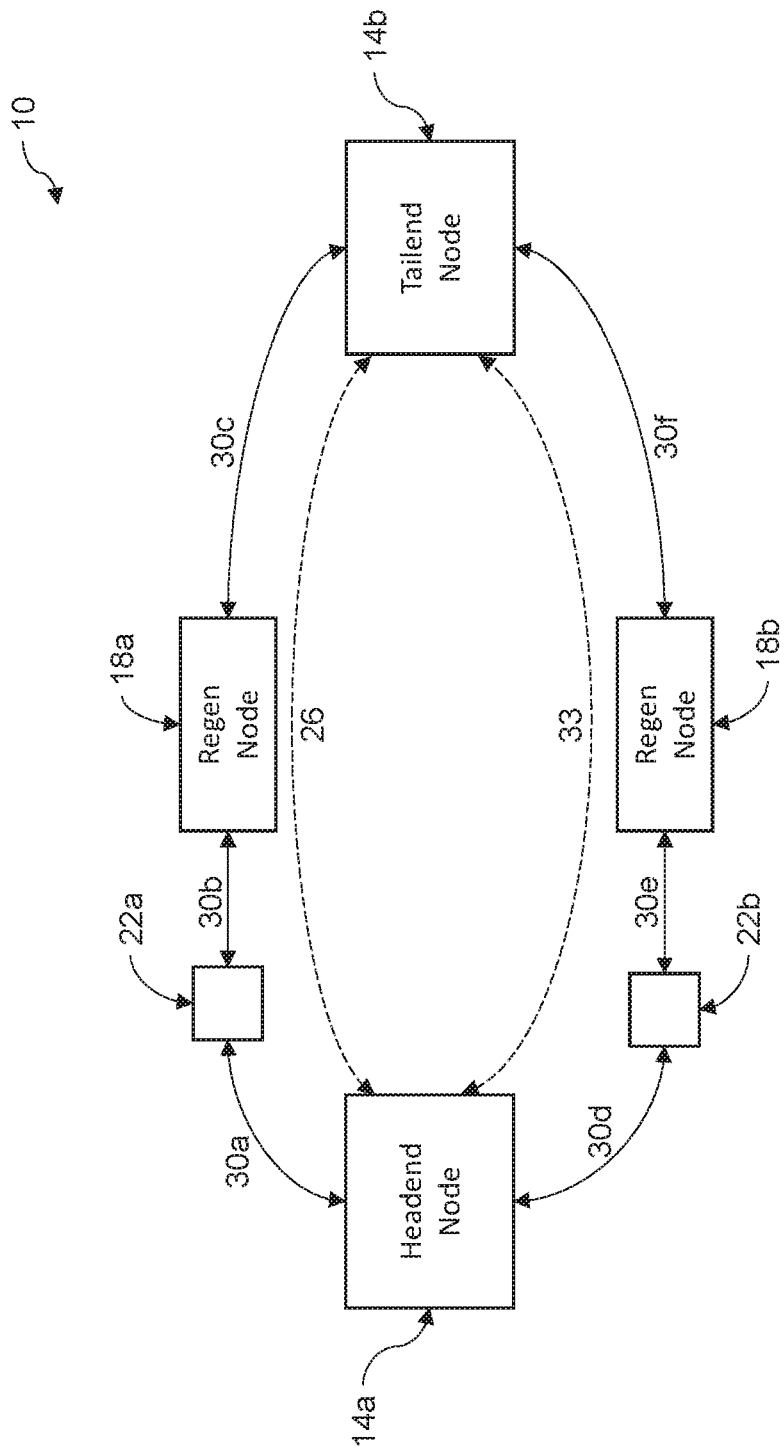
FIG. 1 a block diagram of an exemplary optical mesh network constructed in accordance with the present disclosure having at least one regenerator node (hereinafter referred to as a "regen node").

As used in the description herein, the terms "comprises," "comprising," "includes," "including," "has," "having," or any other variations thereof, are intended to cover a non-exclusive inclusion. For example, unless otherwise noted, a process, method, article, or apparatus that comprises a list of elements is not necessarily limited to only those elements but may also include other elements not expressly listed or inherent to such process, method, article, or apparatus.

Further, unless expressly stated to the contrary, "or" refers to an inclusive and not to an exclusive "or". For example, a condition A or B is satisfied by one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more, and the singular also includes the plural unless it is obvious that it is meant otherwise. Further, use of the term "plurality" is meant to convey "more than one" unless expressly stated to the contrary.

As used herein, qualifiers like "substantially," "about," "approximately," and combinations and variations thereof, are intended to include not only the exact amount or value that they qualify, but also some slight deviations therefrom, which may be due to computing tolerances, computing error, manufacturing tolerances, measurement error, wear and tear, stresses exerted on various parts, and combinations thereof, for example.

As used herein, any reference to "one embodiment," "an embodiment," "some embodiments," "one example," "for example," or "an example" means that a particular element, feature, structure or characteristic described in connection with the embodiment is included in at least one embodiment and may be used in conjunction with other embodiments. The appearance of the phrase "in some embodiments" or "one example" in various places in the specification is not necessarily all referring to the same embodiment, for example.

The use of ordinal number terminology (i.e., "first", "second", "third", "fourth", etc.) is solely for the purpose of differentiating between two or more items and, unless explicitly stated otherwise, is not meant to imply any sequence or order of importance to one item over another.

As used herein, the phrase "based on" is intended to mean "based, at least in part, on" unless explicitly stated otherwise.

The use of the term "at least one" or "one or more" will be understood to include one as well as any quantity more than one. In addition, the use of the phrase "at least one of X, Y, and Z" will be understood to include X alone, Y alone, and Z alone, as well as any combination of X, Y, and Z.

Circuitry, as used herein, may be analog and/or digital components, or one or more suitably programmed processors (e.g., microprocessors) and associated hardware and software, or hardwired logic. Also, "components" may perform one or more functions. The term "component," may include hardware, such as a processor (e.g., microprocessor), an application specific integrated circuit (ASIC), a field programmable gate array (FPGA), a combination of hardware and software, and/or the like. The term "processor" as used herein means a single processor or multiple processors working independently or together to collectively perform a task.

Software may include one or more computer readable instructions that when executed by one or more components cause the component to perform a specified function. It should be understood that the algorithms described herein may be stored on one or more non-transitory computer readable medium. Exemplary non-transitory computer readable mediums may include random access memory, read only memory, flash memory, and/or the like. Such non-transitory computer readable mediums may be electrically based, optically based, magnetically based, and/or the like. Further, the messages described herein may be generated by the components and result in various physical transformations.

The generation of laser beams for use as optical data carrier signals is explained, for example, in U.S. Pat. No. 8,155,531, entitled "Tunable Photonic Integrated Circuits", issued Apr. 10, 2012, and U.S. Pat. No. 8,639,118, entitled "Wavelength division multiplexed optical communication system having variable channel spacings and different modulation formats," issued Jan. 28, 2014, which are hereby fully incorporated in their entirety herein by reference.

A reconfigurable add-drop multiplexer (ROADM) node is an all-optical subsystem that enables remote configuration of wavelengths at any ROADM node. A ROADM is software-provisionable so that a network operator can choose whether a wavelength is added, dropped, or passed through the ROADM node. The technologies used within the ROADM node include wavelength blocking, planar lightwave circuit (PLC), and wavelength selective switching (WSS)—though the WSS has become the dominant technology. A ROADM system is a metro/regional WDM or long-haul DWDM system that includes a ROADM node. ROADMs are often talked about in terms of degrees of switching, ranging from a minimum of two degrees to as many as eight degrees, and occasionally more than eight degrees. A "degree" is another term for a switching direction and is generally associated with a transmission fiber pair. A two-degree ROADM node switches in two directions, typically called East and West. A four-degree ROADM node switches in four directions, typically called North, South, East, and West. In a WSS-based ROADM network, each degree requires an additional WSS switching element. So, as the directions switched at a ROADM node increase, the ROADM node's cost increases.

An Optical Cross-Connect is a device for switching at least a portion of a spectrum of light in an optical signal received on an input optical port to any (one or more) output optical port. An optical cross-connect can be configured on ROADM network elements, with a built-in wavelength selective switch (WSS) component that is used to route an optical signal in any of the fiber degree or direction. For example, an exemplary optical cross connect can be formed within a wavelength selective switch by opening a specified channel, or specific spectrum of light on an input port of the wavelength selective switch. Configuring or pre-configuring an optical cross-connect may be accomplished by providing instructions to a device to cause the device to switch at least a portion of a spectrum of light in an optical signal received on an input port to any (one or more) output optical port.

As used herein, a span, or link, is the spread or extent of a fiber optic cable between the fiber optic cables' terminals. Generally, a span is an unbroken or uninterrupted segment of fiber optic cable between amplifiers. For instance, if a fiber optic cable carried a signal from point A through a repeater or amplifier at point B and on to point C, the fiber optic cable is said to have two spans, a first span from A to B, and a second span from B to C, the length of the spans being the distance between the respective points. A span may also be the distance between amplifiers, even if the fiber optic cable has not been terminated.

Spectral loading, or channel loading, is the addition of one or more channel to a specific spectrum of light described by the light's wavelength in a transmission signal. When all channels within a specific spectrum are being utilized, the specific spectrum is described as fully loaded. A grouping of two or more channel may be called a media channel. Spectral loading may also be described as the addition of one or more media channel to a specific spectrum of light described by the light's wavelength to be supplied onto the optical fiber as the transmission signal.

A Super Channel, as used herein, is a group of wavelengths sufficiently spaced so as not to cause any interference among the group of wavelengths which are sourced from a single light source and managed as a single grouped entity for routing and signaling in an optical network. A super-channel, as used herein, may refer to multiple optical carriers, or channels, that are simultaneously transported over the same optical waveguide (e.g., a single mode optical fiber). Each optical carrier included in a super-channel may be associated with a particular optical wavelength (or set of optical wavelengths). The multiple optical carriers may be combined to create a super-channel using wavelength division multiplexing. For example, the multiple optical carriers may be combined using dense wavelength division multiplexing, in which carrier-to-carrier spacing may be less than one nanometer. In some implementations, each optical carrier may be modulated to carry an optical signal. A channel is further defined in the International Telecommunications Union Recommendation ITU-T G.694.1, "Spectral grids for WDM applications: DWDM frequency grid".

The methods and systems herein disclosed may be used in optical networks. In one embodiment, the optical network has one or more band. A band is the complete optical spectrum carried on the optical fiber. Depending on the fiber used and the supported spectrum which can be carried over long distances with the current technology, relevant examples of the same are: C-Band/L-Band/Extended-C-Band. As used herein, the C-Band is a band of light having a wavelength between about 1528.6 nm and about 1566.9 nm. The L-Band is a band of light having a wavelength between about 1569.2 nm and about 1609.6 nm. Because the wavelength of the C-Band is smaller than the wavelength of the L-Band, the wavelength of the C-Band may be described as a short, or a shorter, wavelength relative to the L-Band. Similarly, because the wavelength of the L-Band is larger than the wavelength of the C-Band, the wavelength of the L-Band may be described as a long, or a longer, wavelength relative to the C-Band.

As used herein, a digital fault or fault signal is a fault condition reported determined after coherent detection in an optical transponder (e.g. Line card). The fault condition may include one or more of the following: LOF—Loss of Frame, based on one or more of an OOF (out of Frame) defect, a OOM (Out of Multi-frame) defect, or a LOM (Loss of Multi-Frame) defect; a Backward Defect Indication (BDI) fault, a Remote BDI (RBDI) fault, a Backward signal degrade (BSD) fault, and/or a remote BSD (RBSD) fault. A BDI is an indication sent upstream by a downstream node detecting LOF. This information is carried in a SDFEC overhead.

As used here, FEC stands for Forward Error Correction.

As used herein, IETF stands for Internet Engineering Task Force.

As used herein, IP stands for Internet Protocol which is a protocol used for communicating data across a packet-switched internetwork using the Internet Protocol Suite, also referred to as TCP/IP.

As used herein, LSP stands for Label Switched Path which is a path through a Generalized Multi-Protocol Label Switching network. Note that Label Switched Paths can be bidirectional or unidirectional; they enable packets to be label switched through the Multiprotocol Label Switched network from a port on an ingress node (which can be called a headend node) to a port on an egress node (which can be called a tailend node).

As used herein, LS is a light source, e.g., a card where data from a digital transport client is modulated/de-modulated to/from an optical channel. This is the place where the optical channel originates/terminates.

As used herein, OA is an Optical Amplifier, that is, a band control gain element generally EDFA or RAMAN based.

As used herein, OAM stands for Operation, Administration and Maintenance, a standardized terminology in transport networks used to monitor and manage the network.

As used herein, OLDP is Optical Layer Defect Propagation. OLDP stands for a fault propagation mechanism in the optical layer for OAM considerations and to facilitate protection or restoration using an overhead frame mapped to an OSC.

OPM (Optical Power Monitor device) stands for a device having a capability to monitor power on a per slice basis.

The Optical Supervisory Channel (OSC) is an additional wavelength that is adapted to carry information about the network and may be used for management functions. The OSC is carried on a different wavelength than wavelengths carrying actual data traffic and is an out-of-band channel. The OSC carries information about the multi-wavelength optical signal as well as remote conditions at the optical add/drop or OA sites. It is used for OAM in DWDM networks. It is the multi-wavelength analogue to SONET's DCC (or supervisory channel). Typically, the OSC is used hop-by-hop and is terminated and restarted at every node. The OSC may be defined based on The International Telecommunications Union (ITU) recommendation ITU-T G.709 to carry overhead corresponding to the layers. Additionally, ITU-T recommendation G.872 specifies defects for the OTS, OMS, and OCh layers as well as specifying Operation, Administration & Maintenance (OAM) requirements. The formation of the OSC is further defined, for example, in U.S. Pat. No. 9,485,124, entitled "Optical layer status exchange over OSC-OAM method for ROADM networks", issued Nov. 1, 2016.

A Slice is an N GHz (N=12.5, 6.25, 3.125) spaced frequency band of the whole of the optical spectrum. Each such constituent band is referred to in the art as a slice. A slice may be the resolution at which the power levels can be measured by the optical power monitoring device. The power level being measured by the optical power monitoring device represents the total optical power carried by the portion of the band represented by that slice. A superchannel pass-band is composed of a set of contiguous slices.

A WSS (Wavelength Selective Switch) is a component used in optical communications networks to route (switch) optical signals between optical fibers on a per-slice basis. Generally power level controls can also be done by the WSS by specifying an attenuation level on a pass-band filter. A wavelength Selective Switch is a programmable device having source and destination fiber ports where the source and destination fiber ports and associated attenuation can be specified for a pass-band.

Referring now to the drawings, and in particular to FIG. 1, shown therein is a block diagram of an exemplary optical mesh network 10 constructed in accordance with the present disclosure. The optical mesh network 10 is depicted as having a plurality of nodes including a headend node 14a and a tailend node 14b, a first regen node 18a, a second regen node 18b, a first intermediary node 22a, and a second intermediary node 22b. An optical signal traveling within the optical mesh network 10 from the headend node 14a to the tailend node 14b may travel along a working path 26 formed from a first span 30a, the first intermediary node 22a, a second span 30b, the first regen node 18a, and a third span 30c to the tailend node 14b. Similarly, a protection path 33 from the headend node 14a to the tailend node 14b may be formed from a fourth span 30d, the second intermediary node 22b, the fifth span 30e, the second regen node 18b, and a sixth span 30f to the tailend node 14b. The protection path 33 may be described as an alternative path, or a backup path, for the optical signal to travel if the optical signal is unable to travel along the working path 26.

The optical mesh network 10 may be, for example, an optical transport network (OTN). An Optical transport Network includes a set of optical switch nodes which are connected by fiber optic links or fiber optic cables. ITU-T recommendations G.709 and G.872 define OTN interface requirements and network architecture respectively. An exemplary OTN may contain multiple optical nodes, such as optical line terminals, optical cross connects, optical line amplifiers, optical add/drop multiplexer (OADMs) and/or reconfigurable optical add/drop multiplexers (ROADMs), interconnected by way of intermediate links. Optical line terminals may be used at either end of a connection or intermediate link. OADM/ROADMs may be used to add, terminate and/or reroute wavelengths or fractions of wavelengths. Optical nodes are further described in U.S. Pat. No. 7,995,921 titled "Banded Semiconductor Optical Amplifiers and Waveblockers"; U.S. Pat. No. 7,394,953 titled "Configurable Integrated Optical Combiners and Decombiners"; and U.S. Pat. No. 8,223,803 entitled "Programmable Time Division Multiplexed Switching," which are incorporated herein by reference in their entirety. Further, it should be understood that each node, e.g., terminal node 14, regen node 18 and intermediary node 22, can be implemented in a variety of manners.

The headend node 14a and the tailend node 14b are each a terminal node. A terminal node may either transmit or receive the transmission signal on the fiber optic path. In one embodiment, the headend node 14a and the tailend node 14b is a ROADM field replaceable unit (FRU). Further, while the working path 26 and the protection path 33 are described as transmitting a signal from the headend node 14a to the tailend node 14b, each of the working path 26 and the protection path 33 may be bidirectional, that is, a signal may be transmitted from the tailend node 14b to the headend node 14a.

The working path 26 is a data path from the headend node 14a to the tailend node 14b configured to carry data traffic while there is no failure or fault signal on the working path 26. If there is a failure or fault signal on the working path 26, the working path 26 is said to be failed. As will be described in more detail below, if the working path 26 is failed, the data traffic may be switched to the protection path 33. Once the failure or fault signal is resolved, the working path 26 may be considered recovered. The working path 26 can be restorable, non-revertive or revertive. Revertive means that the data traffic is directed back to the working path 26 after the working path 26 becomes fault free or recovers from failure. Non-revertive restoration means that the data traffic is not directed back to the working path 26 after the working path 26 is restored.

The working path 26 and the protection path 33 may include one or more intermediary node 22, depicted as the first intermediary node 22a and the second intermediary node 22b in FIG. 1. Each intermediary node 22 may be an optical in-line amplifier, an optical cross connect, an OADM, a ROADM, or another regen node 18. While not shown in FIG. 1 for simplicity, the optical mesh network 10 may also include one or more intermediary node 22 along the third span 30c and/or the sixth span 30f.

The working path 26 and the protection path 33 may include one or more regen node 18, depicted as the first regen node 18a and the second regen node 18b in FIG. 1 and described in more detail below. A regen node 18 is a node of the optical mesh network 10 that acts as an OEO converter, that is, an Optical-Electrical-Optical converter. In general, each regen node 18 receives an input optical signal in an optical layer, converts the optical signal into a first digital data stream in a digital layer, processes the first digital data stream in the digital layer into a second digital data stream, encodes the second digital data stream into an output optical signal in the optical layer, and outputs the output optical signal.

Each span 30a-f is a fiber optic cable connecting each of the nodes in the working path 26 and the protection path 33. In one embodiment, the first intermediary node 22a is an optical in-line amplifier, thus the first span 30a and the second span 30b may be an uninterrupted fiber optic cable, that is, there is no break in the fiber optic cable of the first span 30a and the second span 30b at the first intermediary node 22a. Similarly, when the second intermediary node 22b is an optical in-line amplifier, the fourth span 30d and the fifth span 30e may be an uninterrupted fiber optic cable.

Figure 2:
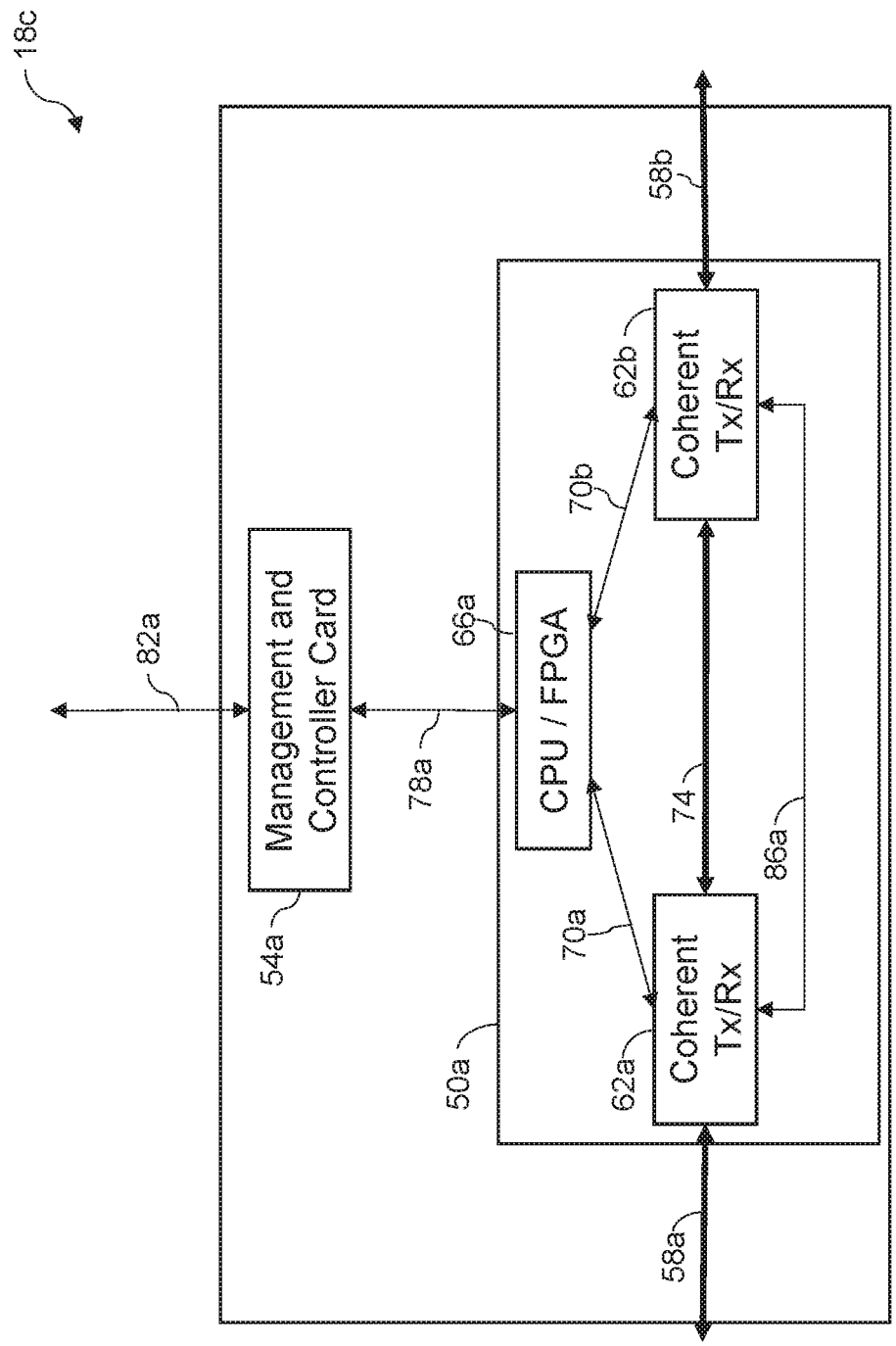
FIG. 2 is a block diagram of an exemplary embodiment of a regen node having one line card constructed in accordance with the present disclosure.
Figure 13:
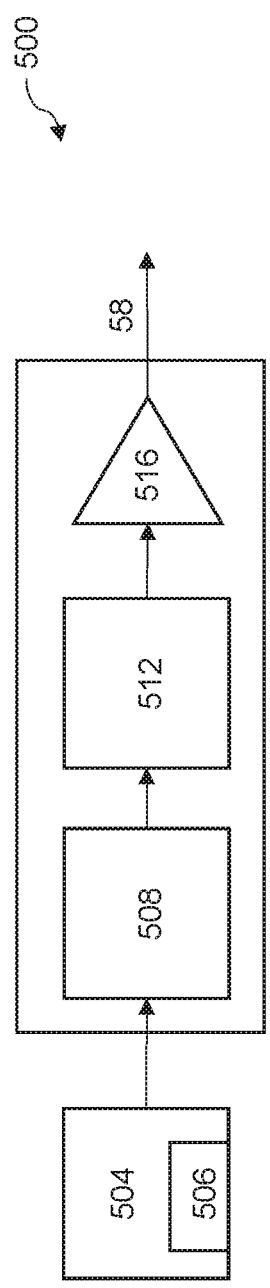
FIG. 13 is a block diagram of an exemplary embodiment of a coherent transmitter portion of a coherent transceiver.
Figure 14:
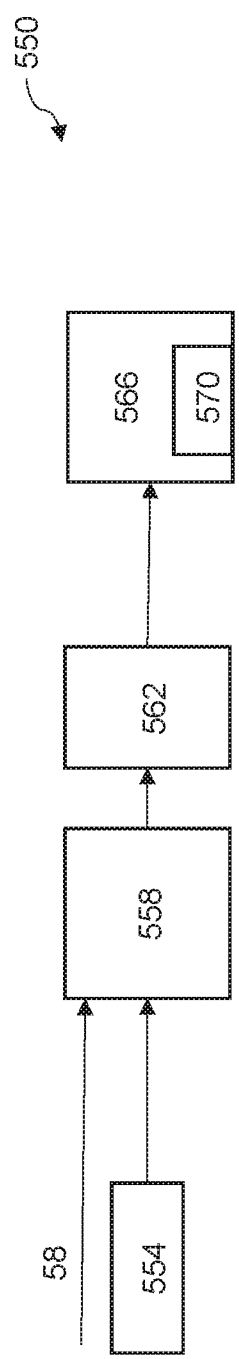
FIG. 14 is a block diagram of an exemplary embodiment of a coherent receiver portion of a coherent transceiver consistent with the present disclosure.

Referring now to FIG. 2, shown therein is a block diagram of an exemplary embodiment of a regen node 18c constructed in accordance with the present disclosure. Generally, the regen node 18c includes one or more line card 50, such as line card 50a having one or more coherent transceiver 62, and a control module 54, such as first control module 54a. Each coherent transceiver 62 may include circuitry such as a coherent receiver, a coherent transmitter, or a combination of both a coherent receiver and coherent transmitter as shown in FIG. 13 and FIG. 14 below.

As shown in FIG. 2, a first fiber optic cable 58a of an upstream span 30 is optically connected to a coherent transceiver 62a of the line card 50a and enables the coherent transceiver 62a of the line card 50a to receive the optical signal in the optical layer. The coherent transceiver 62a, in communication with a processing module 66a via a first processor path 70a, converts the optical signal in the optical layer to a first digital data stream in a digital layer and sends the first digital data stream along a data path 74. The data path 74 connects the coherent transceiver 62a to a coherent transceiver 62b to enable the first digital data stream to be received by the coherent transceiver 62b. The processing module 66a communicates with the coherent transceiver 62b via a second processor path 70b, and further communicates with the first control module 54a via a config path 78a. The first control module 54a may communicate with a control system (not shown) via a management path 82, which is labeled in FIG. 2 with the reference numeral 82a. The coherent transceiver 62a and the coherent transceiver 62b may communicate via a status path 86a. The coherent transceiver 62b, in communication with the processing module 66a via the second processor path 70b, encodes the first digital data stream and any additional information from the processing module 66a, into a second optical signal in the optical layer, and transmits the second optical signal on a downstream span 30 via a second fiber optic cable 58b.

In one embodiment each processing module 66, such as processing module 66a, may include circuitry. Circuitry could be analog and/or digital, components, or one or more suitably programmed microprocessors and associated hardware and software, or hardwired logic. Also, certain portions of the implementations have been described as "components" that perform one or more functions. The term "component," may include hardware, such as a processor, an application specific integrated circuit (ASIC), or a field programmable gate array (FPGA), or a combination of hardware and software. Software includes one or more computer executable instructions that when executed by one or more component cause the component to perform a specified function. It should be understood that the algorithms described herein are stored on one or more non-transitory memory. Exemplary non-transitory memory includes random access memory, read only memory, flash memory or the like. Such non-transitory memory can be electrically based or optically based. Further, the messages described herein may be generated by the components and result in various physical transformations. In one embodiment, the processing module 66a includes an FPGA in place of or in addition to the processor.

In one embodiment, the first control module 54a provides a user interface for controlling system capabilities, including data path programming, alarming, and/or notifications.

In one embodiment, each control module 54 may include a processing module 66 having a processor and non-transitory processor readable memory (memory) storing executable instructions that when executed by the processor cause the processor to perform one or more tasks. In one embodiment, the processing module 66 includes an FPGA in place of or in addition to the processor. In one embodiment, each control module 54 includes software stored on the memory to perform management functions such as configuring one or more line card 50, such as the line card 50a, and/or configure one or more optical protection switch module (OPSM), when present, for data path 74 operations. Each control module 54 of each regen node 18 in the optical mesh network 10 function together to aid in the control and management of the optical mesh network 10. Each control module 54 can run a variety of protocols for conducting the control and management (i.e., Operation, Administration, and Maintenance—referred to as OAM) of the optical mesh network 10. One prominent protocol is referred to in the art as Generalized Multiprotocol Label Switching (GMPLS).

The regen node 18c is bidirectional, that is user data traffic encoded within an optical signal may enter the regen node 18c at the first fiber optic cable 58a and be encoded within another optical signal exiting the regen node 18c at the second fiber optic cable 58b, or the user data traffic encoded within an optical signal may enter the regen node 18c at the second fiber optic cable 58b and be encoded within another optical signal exiting the regen node 18c at the first fiber optic cable 58a. As such, a "receive direction" refers to a direction from which the optical signal enters the regen node 18c and may also be referred to as upstream or the upstream direction and a "transmit direction" refers to a direction to which the optical signal exits the regen node 18c and may also be referred to as downstream or the downstream direction.

In one embodiment, the coherent transceiver 62a in the receive direction, that is, when receiving the optical signal, acts as a coherent receiver and performs coherent detection, OAM information extraction from FEC OH, and processing. OAM information may be carried or stored in FEC OH bytes 104 of an FEC frame 100 (described below). The optical signal, on the optical layer, containing one or more channel as a super channel and an FEC frame 100 having OAM information for the optical mesh network 10 is received by the coherent transceiver 62a. When the coherent transceiver 62a receives the optical signal on the optical layer, the optical signal is converted to the digital layer into at least a digital data stream including data traffic from an upstream node within the super channel and into OAM information from the FEC OH bytes 104. The OAM information is carried over one or more FEC Frame 100. The conversion from the optical layer to the digital layer may be performed, at least in part, by a digital signal processor (DSP).

In one embodiment, detecting a failure of the working path 26 may be performed by monitoring at least one parameter of the optical layer, such as, for example the OAM information. Similarly, detecting a failure of the protection path 33 may be performed by monitoring at least one parameter of the optical layer, such as, the OAM information.

In one embodiment, the coherent transceiver 62a may detect one or more fault, e.g., a SD-FEC fault, in the optical signal. The fault may be a Pre-FEC Signal Degrade or a Post-FEC Signal Failure. The one or more fault may be inferred on a) problems with acquiring framing (i.e., determining frame boundaries) or b) information encoded in frame overhead. Each of the one or more fault may be determined for each of the one or more carriers of the super channel of the optical signal. Detecting the one or more fault in the optical signal may include detecting a fault condition at the regenerator node 18c, such as a loss of frame (LOF) in the optical signal.

Figure 3:
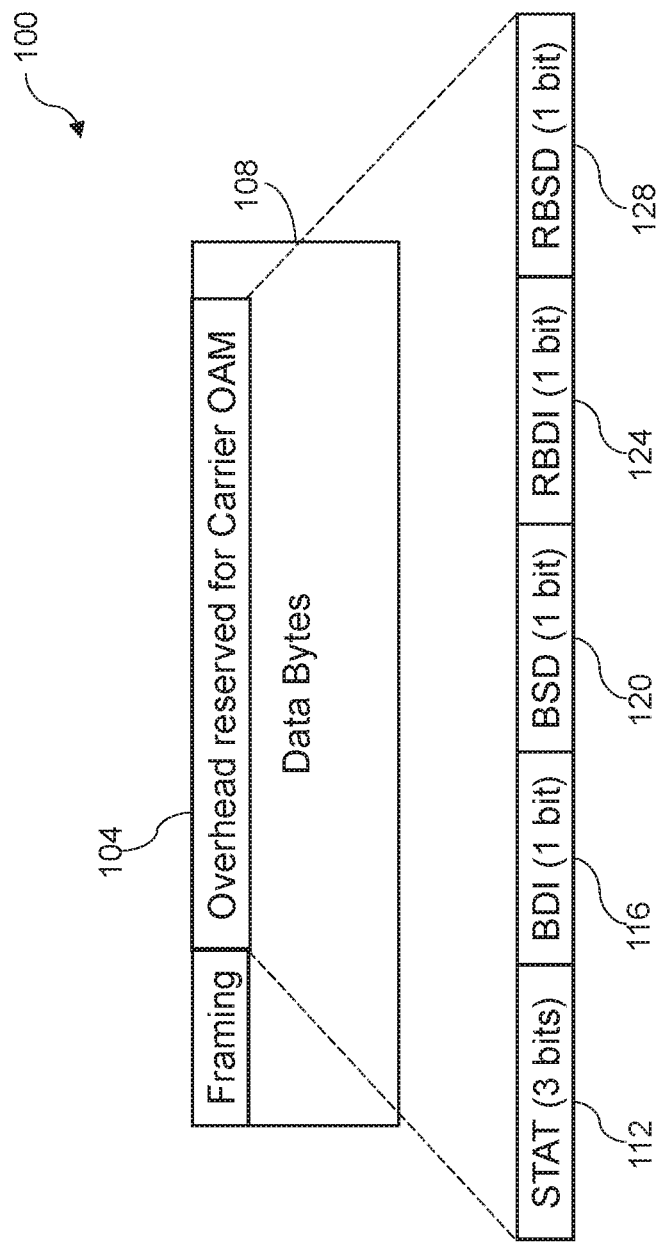
FIG. 3 is a block diagram of an exemplary embodiment of a FEC Frame.

Referring now to FIG. 3, shown therein is a block diagram of an exemplary embodiment of the FEC Frame 100 having a forward error correction over-head (FEC OH) bytes 104 and data bytes 108. In one embodiment, the FEC OH bytes 104 includes at least a STAT field 112, a Backward Defect Indication (BDI) field 116, a Backward Signal Degrade (BSD) field 120, a Remote Backward Defect Indication (RBDI) field 124, and a Remote Backward Signal Degrade (RBSD) field 128. One or more FEC Frame 100 is transmitted and received by each coherent transceiver 62 within the working path 26 and/or the protection path 33. Each FEC Frame 100 carries OAM information between nodes (e.g. terminal nodes 14, regen nodes 18, and/or intermediary nodes 22) within the optical mesh network 10.

The STAT field 112 includes bits configured as indicators regarding the status of the optical signal, such as, for example, Normal, Forward Defect Indication (FDI), Forward Signal Degrade (FSD), and/or reserved space. In some embodiments, the STAT field is three (3) bits long.

In one embodiment, the BDI field 116 is a single-bit field, and can convey, for example, towards the headend node 14a. Backward Defect Indicator (BDI) is a response from a tailend node which has detected a failure in the data traffic that the tailend node received from a headend node. In one embodiment, the BSD field 120 is a single-bit field, and can, for example, convey towards the headend node 14a, a signal degrade status. In one embodiment, the RBDI field 124 is a single-bit field, and can, for example, convey to an upstream node (e.g., towards the headend node 14a), a signal fail status detected by a downstream node (e.g., towards the tailend node 14b). In one embodiment, the RBSD field 128 is a single-bit field, and can, for example, convey to an upstream node (e.g., towards the headend node 14a), a signal degrade status detected by a downstream node (e.g., towards the tailend node 14b).

In one embodiment, the coherent transceiver 62a may process the FEC OH bytes 104 using a DSP to decode and extract the OAM information. In another embodiment, the processing module 66a may process the FEC OH bytes 104 to decode and extract the OAM information. In one embodiment, the coherent transceiver 62a may detect one or more fault in the optical signal, such as, for example, error detection and/or correction using SD-FEC and/or detecting a carrier loss of frame (LOF). The coherent transceiver 62a may update the OAM information to include the detected one or more fault.

Referring again to FIG. 2, in one embodiment, the coherent transceiver 62a, having the digital data stream and the OAM information may transmit the digital data stream along the data path 74 and may send the OAM information to the processing module 66a along the first processor path 70a and/or to the coherent transceiver 62b along the status path 86a. The processing module 66a, in communication with the first control module 54a via the config path 78a, may update the OAM information to include one or more SD-FEC fault, such as, for example, a backward defect status for the BDI field 116, the BSD field 120, the RBDI field 124, and the RBSD field 128, the SD-FEC, and/or some combination thereof. The coherent transceiver 62b factors the one or more SD-FEC fault from the processing module 66a and the OAM information received from the coherent transceiver 62a into an updated OAM information. The updated OAM information is converted into an updated FEC OH bytes 104 and the digital data stream received via the data path 74 is converted into one or more channel as a super channel in the optical layer. The coherent transceiver 62b, acting as a coherent transmitter, transmits the updated FEC OH bytes 104 and the super channel as a second optical signal on the optical layer along the second fiber optic cable 58b.

The SD-FEC fault, e.g., the backward defect status, is notified to the upstream direction super channel as discussed in more detail below. For example, in one embodiment, the coherent transceiver 62b, as a coherent receiver, may receive a first optical signal from a first direction in the optical layer. The coherent transceiver 62b may detect one or more SD-FEC fault in one or more carrier of a super channel of the first optical signal. The SD-FEC fault may be reported to the processing module 66a, which then may report the SD-FEC fault to the first control module 54a. The coherent transceiver 62b, as a coherent transmitter, converts a digital data stream and an OAM information from a second direction traveling towards the first direction, along with the SD-FEC fault from the first direction into a second optical signal traveling in the first direction in the optical layer. In this manner, a detected SD-FEC fault in a received optical signal detected by the line card 50a may be transmitted to an upstream node, such as an upstream terminal node 14, an upstream regen node 18, and/or an upstream intermediary node 22.

Figure 4:
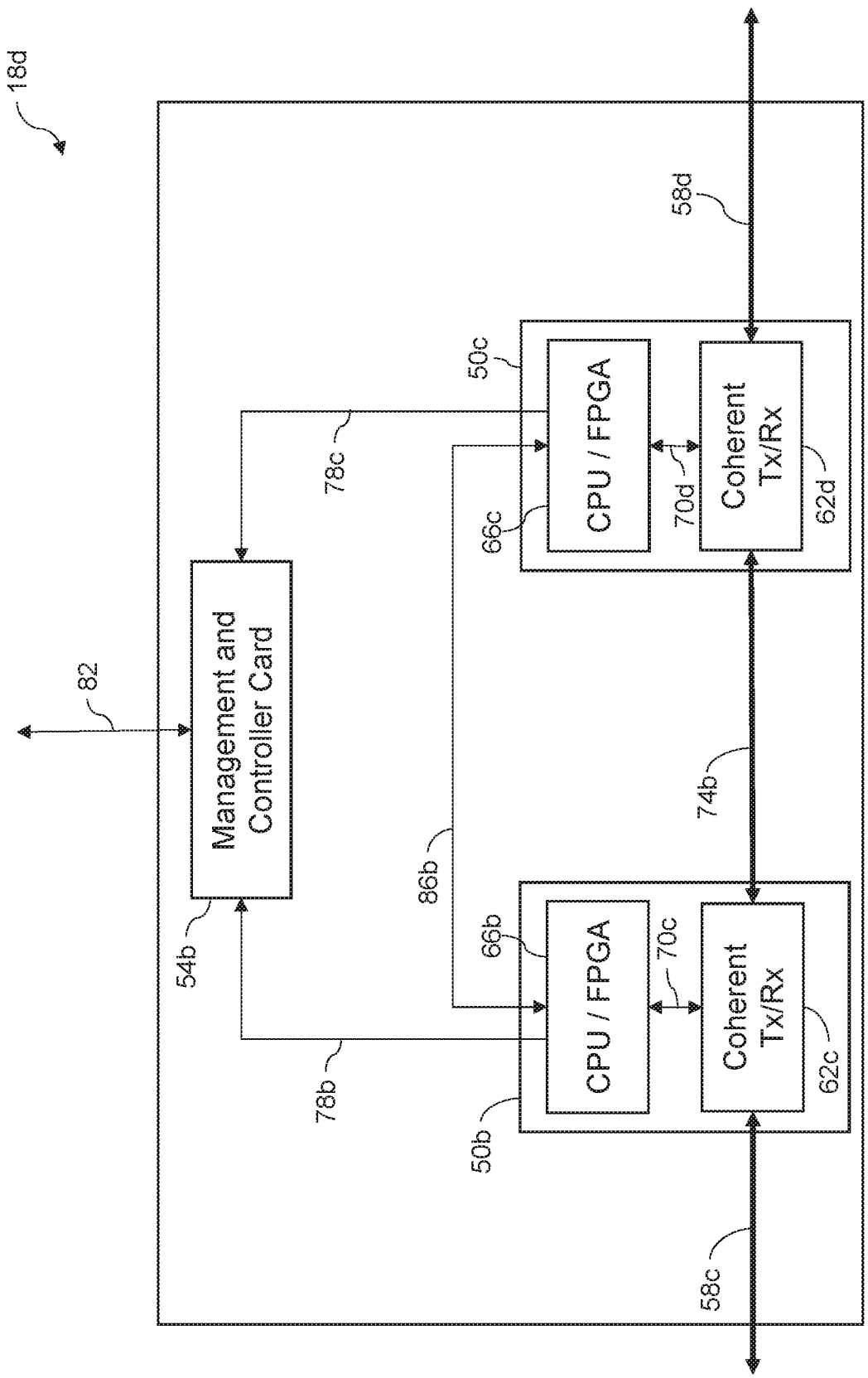
FIG. 4 is a block diagram of an exemplary embodiment of a regen node having two line cards constructed in accordance with the present disclosure.

Referring now to FIG. 4, shown therein is a block diagram of an exemplary embodiment of the regen node 18d constructed in accordance with the present disclosure. Generally, the regen node 18d includes one or more line card 50, such as a second line card 50b having a third coherent transceiver 62c and a second processing module 66b and a third line card 50c having a fourth coherent transceiver 62d and a third processing module 66c, and a control module 54, such as second control module 54b. Each of coherent transceiver 62c and 62d may include a coherent receiver, a coherent transmitter, or a combination of both a coherent receiver and coherent transmitter. The regen node 18d is similar in function to the regen node 18c, however, the regen node 18d includes two line cards 50, second line card 50b and third line card 50c, whereas the regen node 18c includes one line card 50a. Additionally, because the regen node 18d includes two line cards 50*a*, 50*b*, the second data path 74*b* and the second status path 86*b* are not fully contained in a line card 50 whereas the data path 74 and the status path 86*a* are fully contained in the line card 50*a* of regen node 18*c*.

As shown in FIG. 4, a third fiber optic cable 58*c* is optically connected to the third coherent transceiver 62*c* of the second line card 50*b* and enables the third coherent transceiver 62*c* of the second line card 50*b* to receive the optical signal in the optical layer. The third coherent transceiver 62*c*, in communication with the second processing module 66*b* via a third processor path 70*c*, converts the optical signal in the optical layer to a second digital data stream in a digital layer and sends the second digital data stream along a second data path 74*b*. The second data path 74*b* connects the third coherent transceiver 62*c* to the fourth coherent transceiver 62*d* to enable the second digital data stream to be received by the fourth coherent transceiver 62*d*. The second processing module 66*b* communicates with a third processing module 66*c* of the third line card 50*c* via a second status path 86*b*, and further communicates with the second control module 54*b* via a second config path 78*b*. The second control module 54*b* may communicate with a control system (not shown) via a management path 82. The third processing module 66*c* of the third line card 50*c* may be in communication with the second control module 54*b* via a third config path 78*c*. The fourth coherent transceiver 62*d*, in communication with the third processing module 66*c* via the fourth processor path 70*d*, encodes the second digital data stream, any OAM information received via the second status path 86*b*, and any additional information from the third processing module 66*c*, into a fourth optical signal in the optical layer, and transmits the fourth optical signal via a fourth fiber optic cable 58*d*.

In one embodiment, the second control module 54*b* is similar in function to the first control module 54*a* discussed in more detail above. The second control module 54*b* provides a user interface for controlling system capabilities, including data path programming, alarming, and/or notifications.

The regen node 18*d* is bidirectional, that is data traffic encoded in the third optical signal may enter the regen node 18*d* at the third fiber optic cable 58*c* and be encoded within another optical signal exiting the regen node 18*d* at the fourth fiber optic cable 58*d*, or the data traffic encoded within the second optical signal may enter the regen node 18*d* at the fourth fiber optic cable 58*d* and be encoded within another optical signal exiting the regen node 18*d* at the third fiber optic cable 58*c*. As such, a "receive direction" refers to a direction from which the second optical signal enters the regen node 18*d* and may also be referred to as upstream or the upstream direction and a "transmit direction" refers to a direction to which the second optical signal exits the regen node 18*d* and may also be referred to as downstream or the downstream direction.

In one embodiment, the third coherent transceiver 62*c* in the receive direction, that is, when receiving the second optical signal, acts as a coherent receiver and performs coherent detection, OAM information extraction from the FEC OH bytes 104, and processing. For simplicity, the OAM information will be described as carried in the FEC OH bytes 104. The second optical signal, on the optical layer, containing one or more channel as a super channel and FEC frame 100 having OAM information in the FEC OH bytes 104 for the optical mesh network 10 is received by the third coherent transceiver 62*c*. When the third coherent transceiver 62*c* receives the second optical signal on the optical layer, the second optical signal is converted to the digital layer into at least a digital data stream including data traffic from an upstream node and into OAM information from the FEC OH bytes 104. The OAM information is derived from one or more FEC Frame 100 as shown in FIG. 3 and described above in more detail. The conversion from the optical layer to the digital layer may be performed, at least in part, by a digital signal processor (DSP).

In one embodiment, the third coherent transceiver 62*c* may detect one or more fault, e.g., a SD-FEC fault, in the optical signal. The one or more fault may be a Pre-FEC Signal Degrade and Post-FEC Signal Failure. The one or more fault may be included in, or combined with, the OAM information. Each of the one or more fault may be determined for each of the one or more carriers of the super carrier of the optical signal. Detecting the one or more fault in the second optical signal may include reporting a fault if the FEC frame 100 and/or the FEC OH bytes 104 are not detected, thus the fault may indicate a local fault signal, such as a Loss of Frame (LOF).

In one embodiment, the third coherent transceiver 62*c*, having the digital data stream and the OAM information may transmit the digital data stream along the second data path 74*b* and may send the OAM information to the second processing module 66*b* along the third processor path 70*c*. The second processing module 66*b* may then transmit the OAM information to the third line card 50*c* via the second status path 86*b* and/or to the second control module 54*b* via the second config path 78*b*. The third processing module 66*c*, in communication with the second control module 54*b* via the third config path 78*c*, may update the OAM information to include one or more backward defect status, such as, for example, a backward defect status for the BDI field 116, the BSD field 120, the RBDI field 124, and the RBSD field 128, the SD-FEC, and/or some combination thereof. The updated OAM information is converted to data and encoded within the FEC OH bytes 104 of the FEC frame 100 and the digital data stream received via the data path 74 is converted into one or more channel as a super channel in the optical layer. The fourth coherent transceiver 62*d*, acting as a coherent transmitter, transmits the updated FEC frame 100 and the super channel as an updated optical signal on the optical layer along the fourth fiber optic cable 58*d*.

In one embodiment, SD-FEC fault, e.g., the backward defect status, is notified to the upstream direction superchannel as discussed in more detail below. For example, in one embodiment, the fourth coherent transceiver 62*d*, as a coherent receiver, may receive a first optical signal from a first direction in the optical layer. The fourth coherent transceiver 62*d* may detect one or more fault in one or more carrier of a super channel of the first optical signal. The fault may be reported to the third processing module 66*c*, which then may report the fault to the second control module 54*b*. Detecting one or more fault in one or more carrier of a super channel of the first optical signal may include reporting a fault if the FEC frame 100 and/or the FEC OH bytes 104 are not detected thus the fault may indicate a Loss of Frame. The fourth coherent transceiver 62*d*, as a coherent transmitter, converts a digital data stream received via the second data path 74*a* and an OAM information as processed by the third processing module 66*c* from a second direction traveling towards the first direction, along with the SD-FEC fault detected from the first direction into a second optical signal traveling in the first direction in the optical layer. In this manner, an SD-FEC fault in a received optical signal detected by the third line card 50*c* may be transmitted to an upstream node, such as an upstream terminal node 14, an upstream regen node 18, and/or an upstream intermediary node 22.

Figure 5:
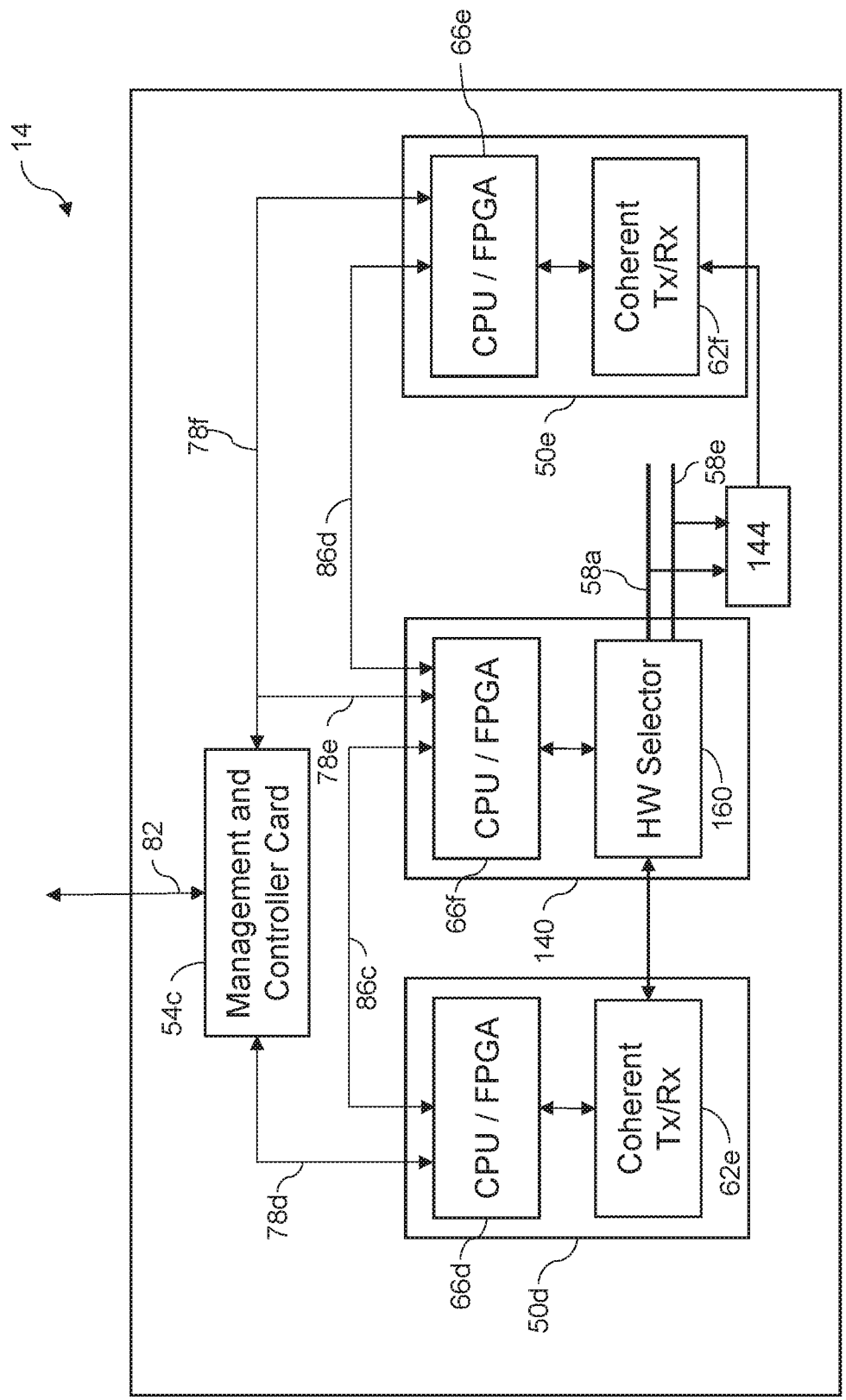
FIG. 5 is a block diagram of an exemplary embodiment of a terminal node constructed in accordance with the present disclosure.

Referring now to FIG. 5, shown therein is a block diagram of an exemplary embodiment of the terminal node 14 constructed in accordance with the present disclosure. The terminal node 14 generally comprises a fourth line card 50*d*, a fifth line card 50*e*, an optical protection switch module (OPSM) 140, a path selector 144, and a third control module 54*c*. The optical protection switch module (OPSM) 140 is in optical communication with the first fiber optic cable 58*a* associated with a working path and a fifth fiber optic cable 58*e* associated with a protection path. While the terminal node 14 embodiment shown in FIG. 5 diagrams the fourth line card 50*d*, the fifth line card 50*e*, the OPSM 140, and the path selector 144 as separate components of the terminal node 14, it is understood that in other embodiments, one of more of the components, e.g., the fourth line card 50*d*, the fifth line card 50*e*, the OPSM 140, and the path selector 144, may be combined.

Generally, the first fiber optic cable 58*a* associated with a working path and the fifth fiber optic cable 58*e* associated with a protection path are connected to the OPSM 140. The optical signal of the working path (working optical signal) traveling along the first fiber optic cable 58*a* and the optical signal of the protection path (protection optical signal) enter the OPSM 140. As detailed below, the OPSM 140 enables optical communication from either the first fiber optic cable 58*a* or the fifth fiber optic cable 58*e*, to the fifth coherent receiver of the fourth line card 50*d*, thus either the working optical signal or the protection optical signal is sent to the fourth line card 50*d* as an active optical signal. As discussed in more detail above, the fifth coherent receiver 62*e*, in communication with a fourth processing module 66*d*, converts the active optical signal in the optical layer into an active digital data stream having OAM information, such as one or more active FEC frame, and an active data traffic in the digital layer. The fourth processing module 66*d* may send the OAM information to the third control module 54*c* via the fourth config path 78*d* and to the OPSM 140 via the third status path 86*c*. The third control module 54*c* may process and transmit the OAM information via the management path 82, via a fifth config path 78*e* to the OPSM 140, and/or via a sixth config path 78*f* to the fifth line card 50*e*.

As described in more detail below, in one embodiment OPSM 140 optically connects the first fiber optic cable 58*a* to the fifth coherent receiver 62*e* of the fourth line card 50*d*, thus causing the working optical signal to be sent to the fourth line card 50*d* as the active optical signal. If the OPSM 140 receives OAM information indicating the working path has failed then the OPSM 140 optically connects the fifth fiber optic cable 58*e* to the fifth coherent receiver 62*e* of the fourth line card 50*d*, thus causing the protection optical signal to be sent to the fourth line card 50*d* as the active optical signal.

In one embodiment, the first fiber optic cable 58*a* and the fifth fiber optic cable 58*e* are in optical communication with the path selector 144. The path selector 144 may be in communication with the OPSM 140 and/or the third control module 54*c* to receive a switch signal indicating whether the working path or the protection path is an active path or a standby path. If the path selector 144 receives the switch signal indicating the working path is the active path, the path selector 144 optically connects the fifth fiber optic cable 58*e* to a sixth coherent receiver 62*f* of the fifth line card 50*e*, thus transmitting the protection optical signal as a standby optical signal. Similarly, if the path selector 144 receives the switch signal indicating the protection path is the active path, the path selector 144 optically connects the first fiber optic cable 58*a* to the sixth coherent receiver 62*f* of the fifth line card 50*e*, thus transmitting the working optical signal as the standby optical signal to the fifth line card 50*e*. In this way, the path selector 144 optically connects the standby path, and thus the standby optical signal, to the fifth line card 50*e*. The sixth coherent receiver 62*f*, in communication with a fifth processing module 66*e*, converts the standby optical signal in the optical layer into a standby digital data stream having OAM information, such as one or more standby FEC frame, and a standby data traffic in the digital layer. The fifth processing module 66*e* may send the standby OAM information to the third control module 54*c* via the sixth config path 78*f* and to the OPSM 140 via a fourth status path 86*d*. The third control module 54*c* may process and transmit the standby OAM information, including the one or more standby FEC frame, via the management path 82, via the fifth config path 78*e* to the OPSM 140, and/or via the fourth config path 78*d* to the fourth line card 50*d*. Thus, the standby OAM information, that is, OAM information for the standby path, can be detected and monitored by the third control module 54*c*.

Figure 6:
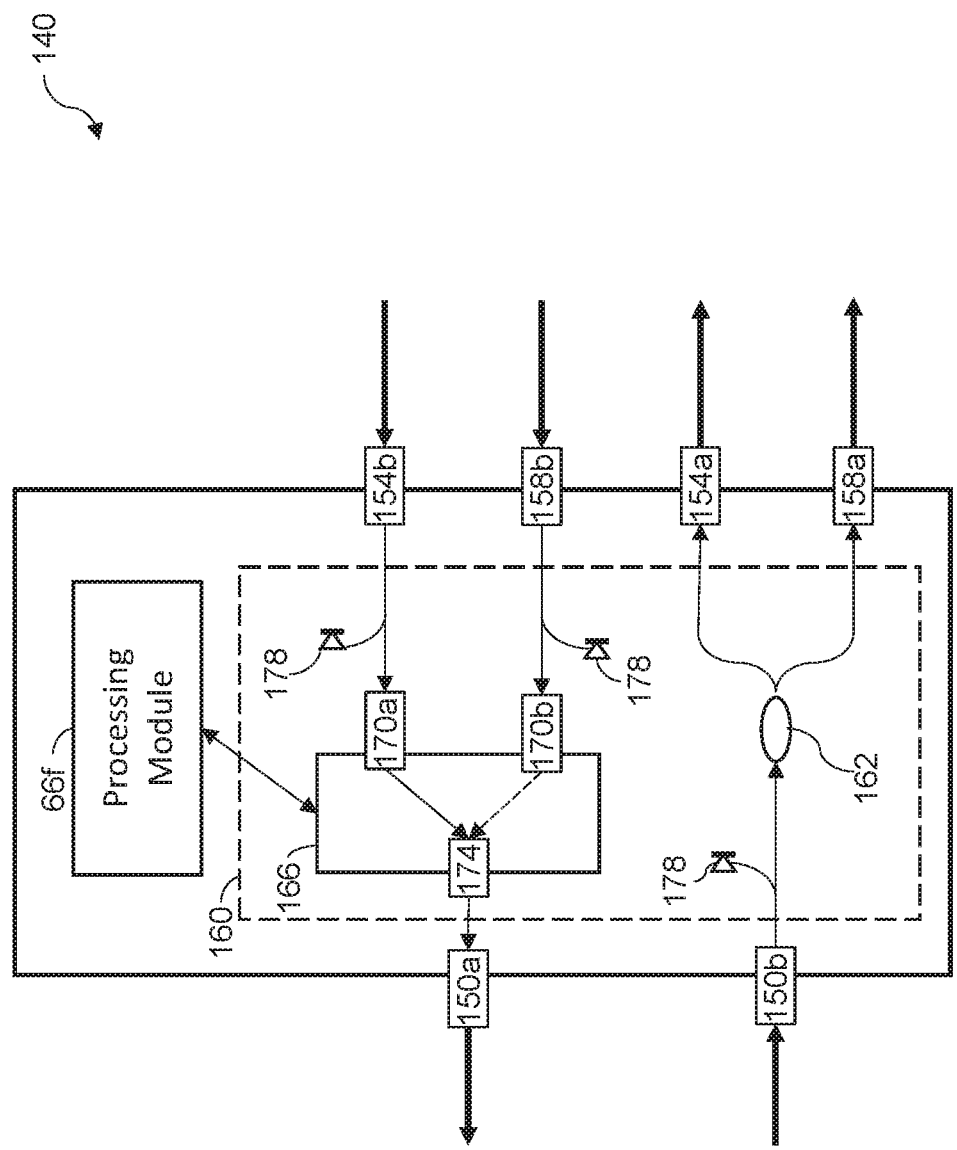
FIG. 6 is a block diagram of an exemplary embodiment of an optical protection switch module (OPSM) of the terminal node of FIG. 5 constructed in accordance with the present disclosure.

Referring now to FIG. 6, shown therein is a block diagram of an exemplary embodiment of the OPSM 140 of FIG. 6 constructed in accordance with the present disclosure. Generally, the OPSM 140 facilitates data traffic recovery in the optical mesh network 10. Protection within the optical mesh network 10 requires that the same data traffic be sent on both the working path 26 and the protection path 33 by transmitting the same optical signal from the headend node 14*a* to the tailend node 14*b*. In the receive direction, that is, at the tailend node 14*b*, the path selector 144 is used to select either the working path 26 or the protection path 33 based on the OAM information in the FEC OH bytes 104 for each channel of each of the optical signal sent along the working path 26 (working optical signal) or the optical signal sent along the protection path 33 (protection optical signal). The OPSM 140 comprises at least a system port 150, a first line port 154 and a second line port 158; however, to better illustrate the functionality of the OPSM 140, FIG. 6 depicts a separate port for transmitting and receiving for each of the ports. Thus, as shown in FIG. 6, the OPSM 140 comprises a transmit system port 150*a* and a receive system port 150*b*, a transmit first line port 154*a* and a receive first line port 154*b*, and a transmit second line port 158*a* and a receive second line port 158*b*. While the transmit system port 150*a* and the receive system port 150*b*, the transmit first line port 154*a* and the receive first line port 154*b*, and the transmit second line port 158*a* and the receive second line port 158*b* are shown separately for purposed of clarity, it should be understood that one or more of the transmit system port 150*a* and the receive system port 150*b*, the transmit first line port 154*a* and the receive first line port 154*b*, and/or the transmit second line port 158*a* and the receive second line port 158*b* could be a single port and implemented as a single device in the OPSM 140.

Also shown is a power splitter 162 dividing a power of a signal on the receive system port 150*b* to each of the transmit first line port 154*a* and the transmit second line port 158*a*. The OPSM 140 further includes an optical switch 166. The optical switch 166 has a first input 170*a* optically connected to the receive first line port 154*b* and a second input 170*b* optically connected to the receive second line port 158*b*. The optical switch 166 selectively, optically connects either the receive first line port 154*b* and the receive second line port 158*b* to an output 174, which is optically connected to the transmit system port 150a. The OPSM 140 may further include a fifth processing module 66e. The fifth processing module 66e may receive OAM information from the third control module 54c and process the OAM information to determine one or more fault signal. In one embodiment, one or more photodiode 178 may be placed to optically detect a power from an optical signal received at any receive port, such as the receive system port 150b, the receive first line port 154b, and/or the receive second line port 158b.

In one embodiment, the fifth processing module 66e may use the power of the optical signal received at the receive first line port 154b; the power of the optical signal received at the receive second line port 158b; and the OAM information; or some combination thereof, to control the optical switch 166 to selectively, optically connect a particular receive line port 154b, 158b to the transmit system port 150a.

For example and not by way of limitation, if the fifth processing module 66e determines there is a fault signal or that the power of the optical signal is below a power threshold for the receive first line port 154b, the fifth processing module 66e may cause the optical switch 166 to select and optically connect the second input 170b to the output 174, thus causing the optical signal on the receive second line port 158b to be transmitted to the transmit system port 150a. Similarly, if the fifth processing module 66e determines there is a fault signal or that the power of the optical signal is below a power threshold for the receive second line port 158b, the fifth processing module 66e may cause the optical switch 166 to select and optically connect the first input 170a to the output 174, thus causing the optical signal on the receive first line port 154b to be transmitted to the transmit system port 150a. In the case that there is no fault signal on either of the optical signal on the receive first line port 154b or the receive second line port 158b, the fifth processing module 66e may cause the optical switch 166 to select the input 170 corresponding to the receive line port 154b, 158b being optically connected to the working path 26.

Referring now to FIGS. 7A-D, shown therein are block diagrams of exemplary embodiments of SD-FEC fault treatment scenarios across a regen site for various defects detected by either a downstream terminal node 14 or a regen node 18. The following scenarios are provided as non-limiting examples of combinations of different defects such as LOS, LOF, SF, FDI, BDI, RBDI, BSD, and RBSD, for example, as detected at a regen node 18 or terminal node 14 or as forwarded from a regen node 18 or terminal node 14.

Figure 7A:
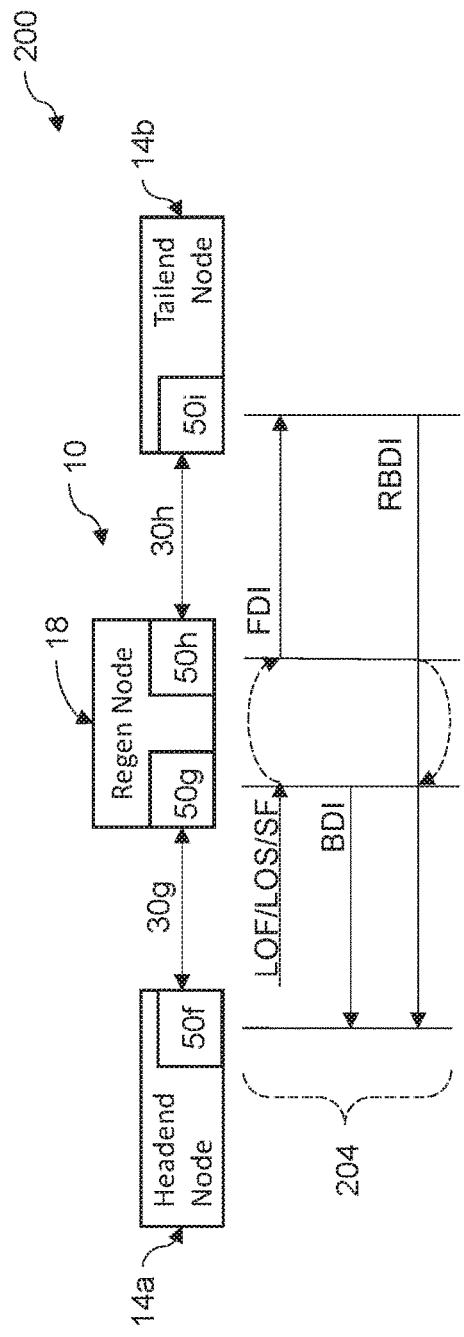
FIG. 7A is a diagram of an exemplary embodiment of a Carrier Loss of Frame (LOF) Soft Decision Forward Error Correction (SD-FEC) fault treatment scenario having a fault before a regen node.

Referring now to FIG. 7A, shown therein is a diagram of an exemplary embodiment of a Carrier LOF SD-FEC fault treatment scenario 200 depicting a simplified optical mesh network 10 transmitting an optical signal from the headend node 14a to the tailend node 14b, the headend node 14a having a line card 50f optically connected via span 30g to a line card 50g of the regen node 18, and the regen node 18 having a second line card 50h optically connected via span 30h to a line card 50i of the tailend node 14b. Shown below the simplified optical mesh network 10 is a fault signal diagram 204 indicating the fault signal present in each of the span 30g and the span 30h. As shown, within the span 30g, the optical signal from the headend node 14a experiences a Loss of Signal (LOS), a Loss of Frame (LOF), or an SD-FEC based Signal Fail (SF) which is detected by the line card 50g. The regen node 18 then forwards a forward defect indication (FDI) downstream by including the FDI in first OAM information that is processed and transmitted with the optical signal by the second line card 50h along span 30h to the tailend node 14b. The regen node 18 also forwards a backward defect indication (BDI) upstream by including the BDI in a second OAM information of a second optical signal that is traveling from the tailend node 14b towards the headend node 14a. The tailend node 14b, having received the optical signal and processed the first OAM information, forwards a Remote Backward Defect Indication (RBDI) upstream by including the RBDI in the second OAM information of the second optical signal traveling from the tailend node 14b to the headend node 14a. In this way, the headend node 14a is made aware of a defect between the headend node 14a and the regen node 18. Furthermore, as shown, the defect is transmitted across the regen node 18 when the second line card 50h includes the FDI in the first OAM information.

Figure 7B:
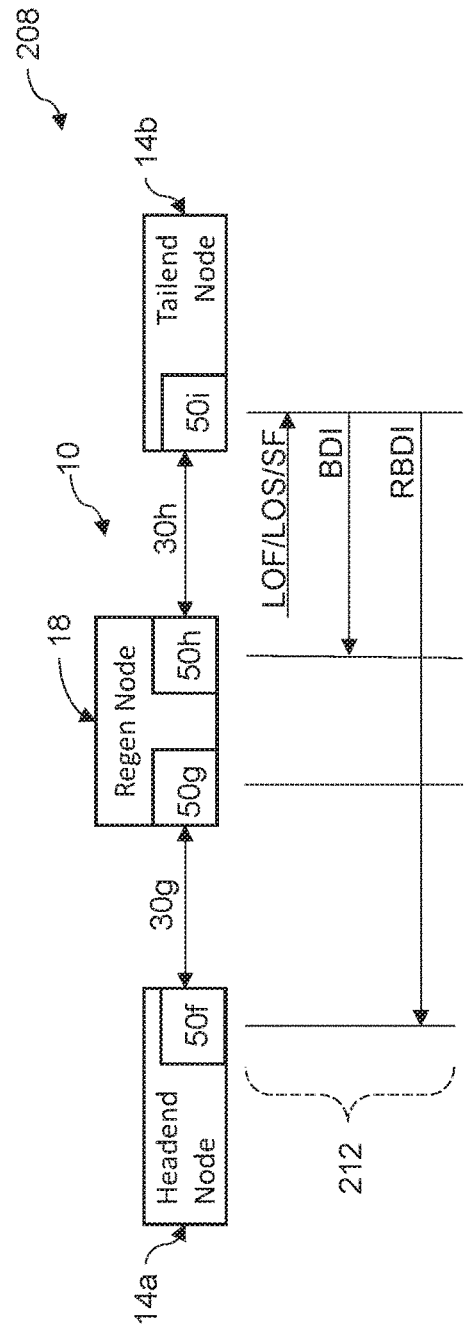
FIG. 7B is a diagram of an exemplary embodiment of a Carrier LOF SD-FEC fault treatment scenario having a fault before a terminal node.

Referring now to FIG. 7B, shown therein is a diagram of an exemplary embodiment of a Carrier LOF SD-FEC fault treatment scenario 208 depicting the same simplified optical mesh network 10 of FIG. 7A transmitting an optical signal from the headend node 14a to the tailend node 14b. Shown below the simplified optical mesh network 10 is a fault signal diagram 212 indicating the fault signal present in each of the span 30g and the span 30h. As shown, within the span 30h, the optical signal from the headend node 14a experiences one or more of a Loss of Signal (LOS), a Loss of Frame (LOF), or an SD-FEC based Signal Fail (SF) which is detected by the line card 50i of the tailend node 14b. The tailend node 14b then forwards a backward defect indication (BDI) upstream to the regen node 18 by including the BDI in a second OAM information of a second optical signal that is traveling from the tailend node 14b towards the headend node 14a and forwards a remote backward defect indication (RBDI) upstream to the headend node 14a by including the RBDI in the second OAM information of the second optical signal that is traveling from the tailend node 14b towards the headend node 14a. In this way, the headend node 14a is made aware of a defect between the regen node 18 and the tailend node 14b on a different segment and the regen node 18 is made aware of a defect between the regen node 18 and the tailend node 14b. Furthermore, as shown, the defect is transmitted across the regen node 18.

Referring now to FIG. 7C, shown therein is a diagram of an exemplary embodiment of a Carrier Pre-FEC-SD fault treatment scenario 216 depicting the same simplified optical mesh network 10 of FIG. 7A transmitting an optical signal from the headend node 14a to the tailend node 14b. Shown below the simplified optical mesh network 10 is a fault signal diagram 220 indicating the fault signal present in each of the span 30g and the span 30h. As shown, within the span 30g, the optical signal from the headend node 14a experiences a Pre-FEC Signal Degrade (Pre-FEC-SD) which is detected by the line card 50g of the regen node 18. The regen node 18 then forwards a forward signal degrade (FSD) downstream by including the FSD in first OAM information that is processed and transmitted with the optical signal by the second line card 50h along span 30h to the tailend node 14b. The regen node 18 also forwards a backward signal degrade (BSD) upstream by including the BSD in a second OAM information of a second optical signal that is traveling from the tailend node 14b towards the headend node 14a. The tailend node 14b, having received the optical signal and processed the first OAM information, forwards a Remote Backward Signal Degrade (RBSD) upstream by including the RBSD in the second OAM information of the second optical signal traveling from the tailend node 14b to the headend node 14a. In this way, the headend node 14a is made aware of a defect between the headend node 14a and the regen node 18. Furthermore, as shown, the defect is transmitted across the regen node 18 when the second line card 50h includes the FSD in the first OAM information.

Referring now to FIG. 7D, shown therein is a diagram of an exemplary embodiment of a Carrier LOF SD-FEC fault treatment scenario 224 depicting the same simplified optical mesh network 10 of FIG. 7A transmitting an optical signal from the headend node 14a to the tailend node 14b. Shown below the simplified optical mesh network 10 is a fault signal diagram 228 indicating the fault signal present in each of the span 30g and the span 30h. As shown, within the span 30h, the optical signal from the headend node 14a experiences a Pre-FEC Signal Degrade (Pre-FEC-SD) which is detected by the line card 50i of the tailend node 14b. The tailend node 14b then forwards a backward signal degrade (BSD) upstream to the regen node 18 by including the BSD in a second OAM information of a second optical signal that is traveling from the tailend node 14b towards the headend node 14a and forwards a remote backward signal degrade (RBSD) upstream to the headend node 14a by including the RBSD in the second OAM information of the second optical signal that is traveling from the tailend node 14b towards the headend node 14a. In this way, the headend node 14a is made aware of a defect between the regen node 18 and the tailend node 14b on a different span 30 and the regen node 18 is made aware of a defect between the regen node 18 and the tailend node 14b. Furthermore, as shown, the defect is transmitted across the regen node 18.

In one embodiment, when a node, either a terminal node 14 or a regen node 18 forwards a defect signal upstream, the "remote" defect, e.g., RBSD or RBDI, is forwarded when more than one span 30 is between the node identifying the defect and the headend node 14a. When a regen node 18 receives a remote defect, such as RBSD or RBDI, the regen node 18 will process the remote defect and will continue to forward the remote defect such that all regen nodes 18 and the headend node 14a are made aware of the remote defect.

The simplified optical mesh network as shown in FIGS. 7A-D depicts only one regen node 18 between the headend node 14a and the tailend node 14b for simplicity. However, it is understood that one or more than one regen node 18 may be intermediate the regen node 18 and the headend node 14a and that one or more than one regen node 18 may be intermediate the regen node 18 and the tailend node 14b.

Figure 8:
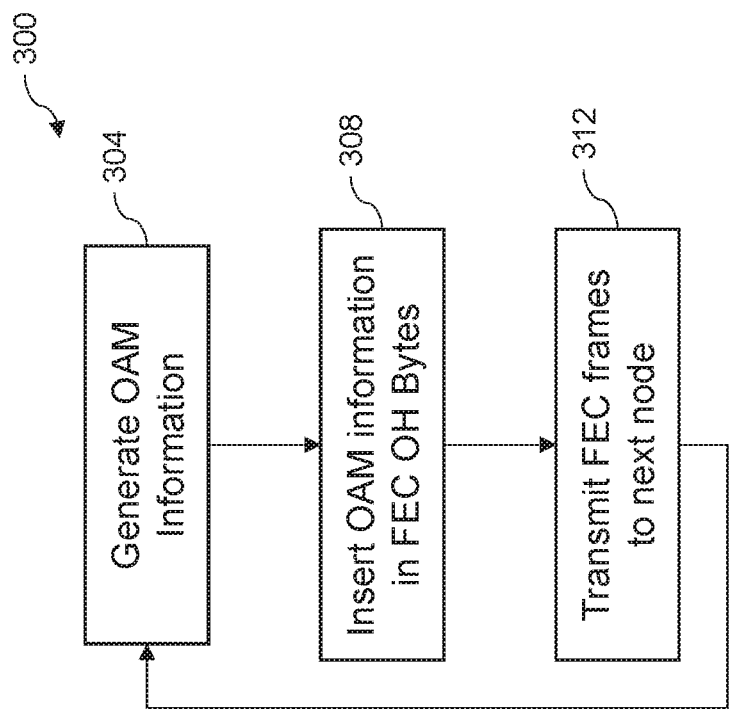
FIG. 8 is a process flow diagram of an exemplary embodiment of a transmit process in accordance with the present disclosure.

Referring now to FIG. 8, shown therein is a process flow diagram of an exemplary embodiment of a transmit process 300 in accordance with the present disclosure. Generally, the transmit process 300 is performed by the line card 50 and includes the steps: generating OAM information (step 304); inserting OAM information in FEC OH bytes (step 308); and transmitting FEC frames to next node (step 312) in the working path 26. In one embodiment generating OAM information (step 304) may be performed by processing a received carrier status, processing peer OAM information received from another line card 50, and processing management configuration received from the control module 54 to establish downstream OAM information, that is, OAM information intended for a downstream node. Inserting OAM information in FEC OH bytes (step 308) may be performed by the line card 50, and more specifically, may be performed by a processing module 66 within the line card 50. Transmitting FEC frames to the next node (step 312) may be performed by a coherent transceiver or coherent transmitter associated with the line card 50.

Figure 9:
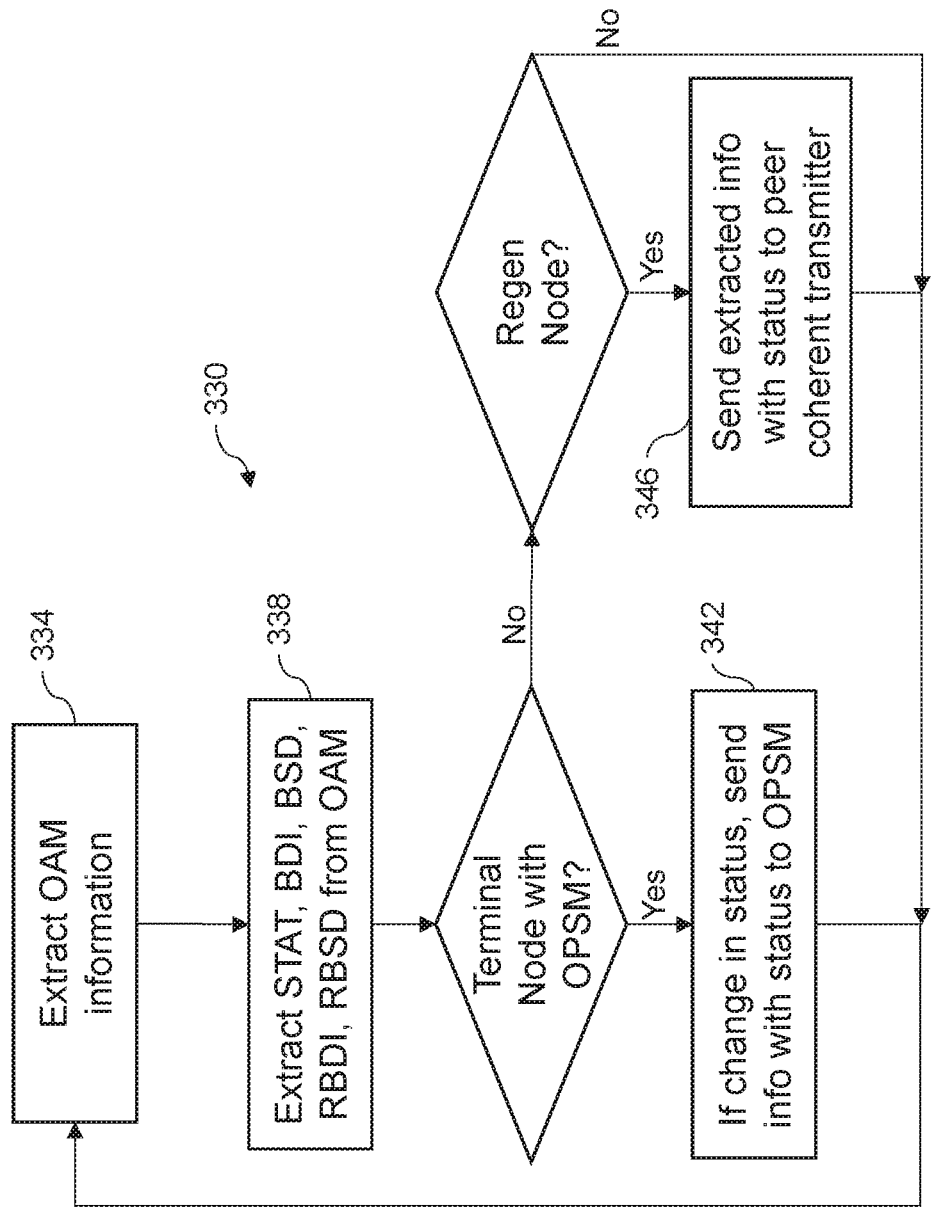
FIG. 9 is a process flow diagram of an exemplary embodiment of a receive process in accordance with the present disclosure.

Referring now to FIG. 9, shown therein is a process flow diagram of an exemplary embodiment of a receive process 330 in accordance with the present disclosure. Generally, the receive process 330 is performed by the terminal node 14 or the regen node 18 and includes the steps of: extracting OAM information from received FEC frames (step 334); extracting a fault signal, such as STAT, BDI, RBDI, BSD, RBSD fault signals from the OAM information (step 338); if the node is the terminal node 14 with an OPSM, sending extracted OAM information along with carrier status to the OPSM if there is a change in status (step 342) or, if the node is the regen node 18, sending extracted OAM information along with carrier status to peer coherent transmitter or coherent transceiver (step 346).

Figure 10:
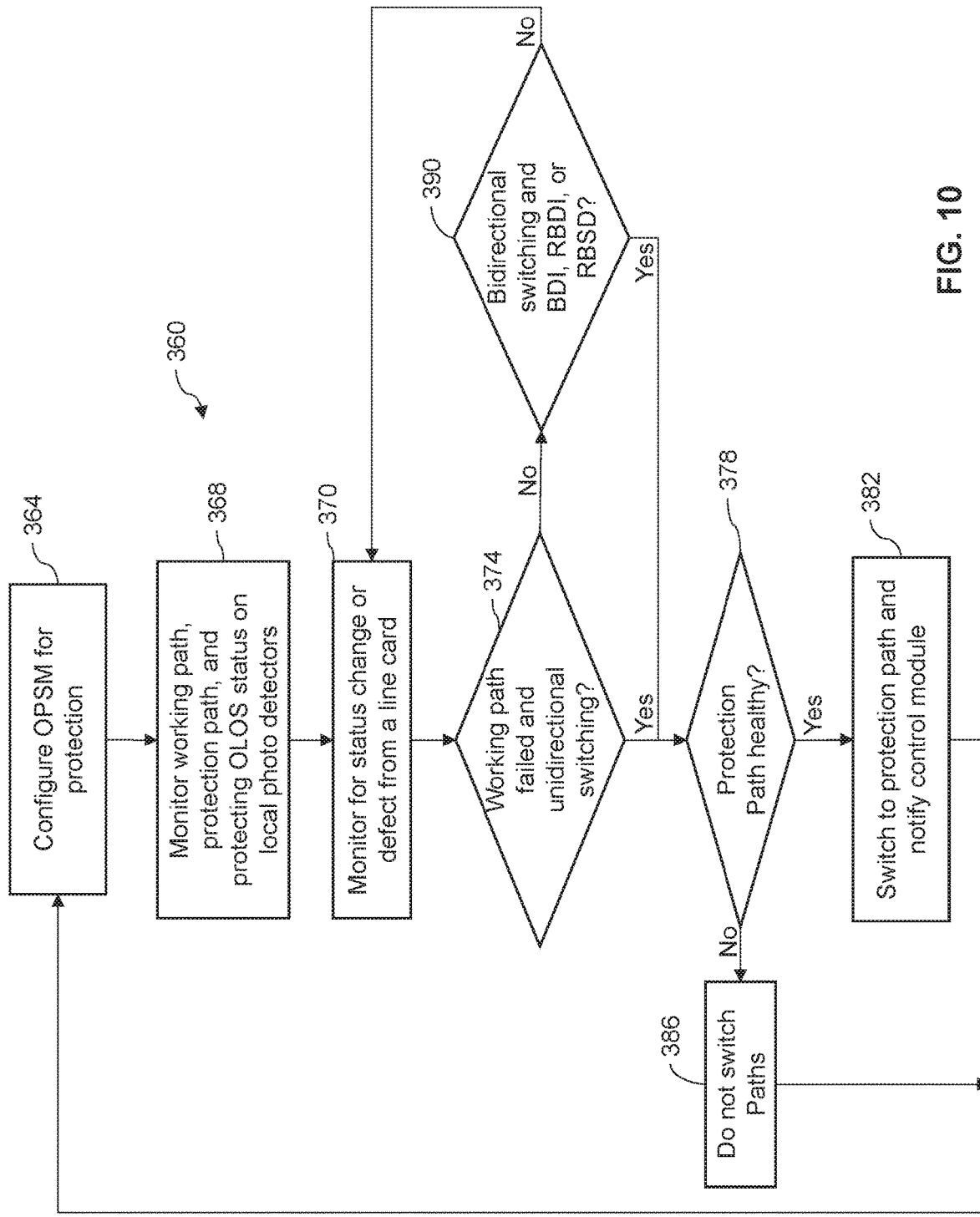
FIG. 10 is a process flow diagram of an exemplary embodiment of an OSPM handling process in accordance with the present disclosure.

Referring now to FIG. 10, shown therein is a process flow diagram of an exemplary embodiment of an OSPM handling process 360 in accordance with the present disclosure. The OSPM handling process 360 is performed by the terminal node 14 and generally includes the steps: configuring the OPSM for protection (step 364); monitoring the working path 26, the protection path 33, and protecting OLOS status on local photo detectors (step 368); monitor for a status change or defect from one or more line card 50 (step 370); determining if the active path has a failure (e.g., OLOS, FDI, FSD, or SD-FEC) and a switching mode is unidirectional switching (step 374); if the active path has a failure and the switching mode is unidirectional switching, determining if the protection path 33 is healthy (step 378); if the protection path 33 is healthy, switching over to the protection path 33 and notifying control module (step 382); if the protection path 33 is not healthy, do not switch to the protection path 33 (step 386); if the active path does not have a failure or the switching mode is not unidirectional switching, determine whether the switching mode is bi-directional and if there is a defect of any of BDI, RBDI, or RBSD (step 390); if step 390 is true, continue to step 378; however if step 390 is false, continue to step 370.

Figure 11:
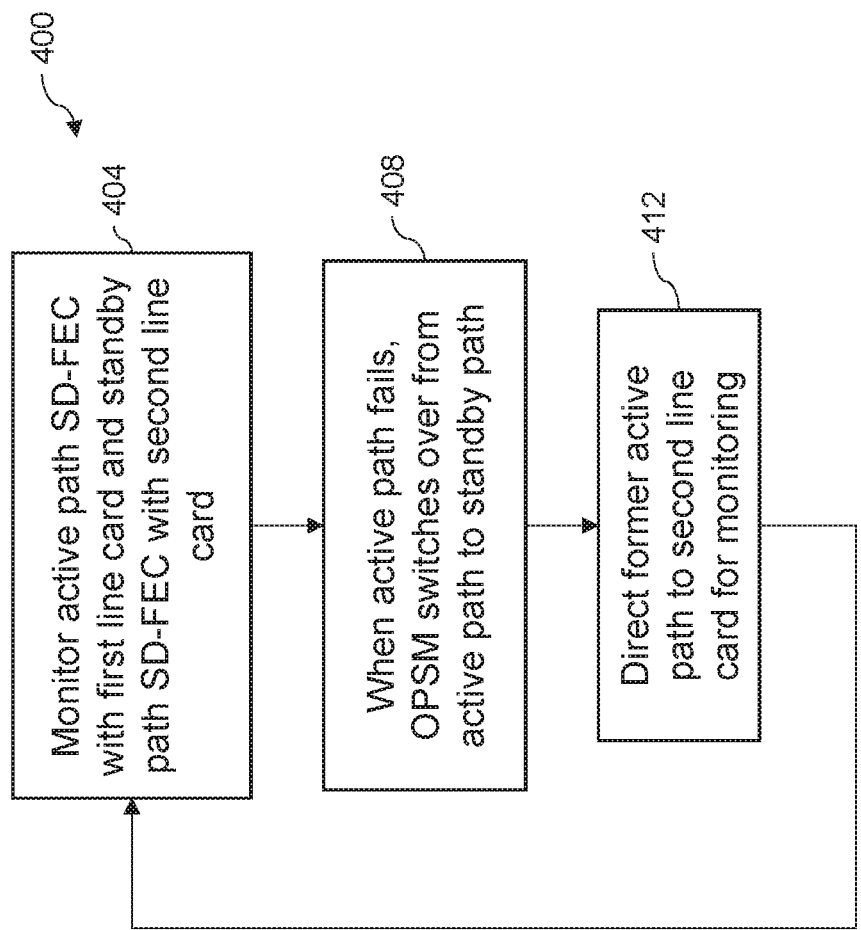
FIG. 11 is a process flow diagram of an exemplary embodiment of a standby path monitoring process in accordance with the present disclosure.

Referring now to FIG. 11, shown therein is a process flow diagram of an exemplary embodiment of a standby path monitoring process 400 in accordance with the present disclosure. The standby path monitoring process 400 generally includes the steps: monitoring the active path SD-FEC with a first line card 50 and monitoring the standby path SD-FEC with a second line card 50 (step 404); causing the OPSM to switch from the active path to the standby path when the active path fails (step 408); and directing the former active path to the second line card for monitoring (step 412). In one embodiment, the standby path monitoring process 400 may start with the working path 26 being the active path and the protection path 33 being the standby path. At step 408, when the OPSM switched from the active path to the standby path, that is, when the OPSM switched from the working path 26 to the protection path 33, the protection path 33 now becomes the active path and the failed working path 26 is now the standby path. At step 412, the former active path/current standby path/failed path is directed to the second line card 50 for monitoring while the active path is monitored by the first line card 50.

In one embodiment, when data traffic from the working path 26 is selected by the OPSM 140, the protection path 33 (also referred to herein as the standby path) is directed to the second line card 50 for coherent monitoring purposes, that is, the second line card 50 will monitor and process the OAM information received on the protection path 33. Both the first line card 50 and the second line card 50 are configured to report any defects to the OPSM 140.

Figure 12:
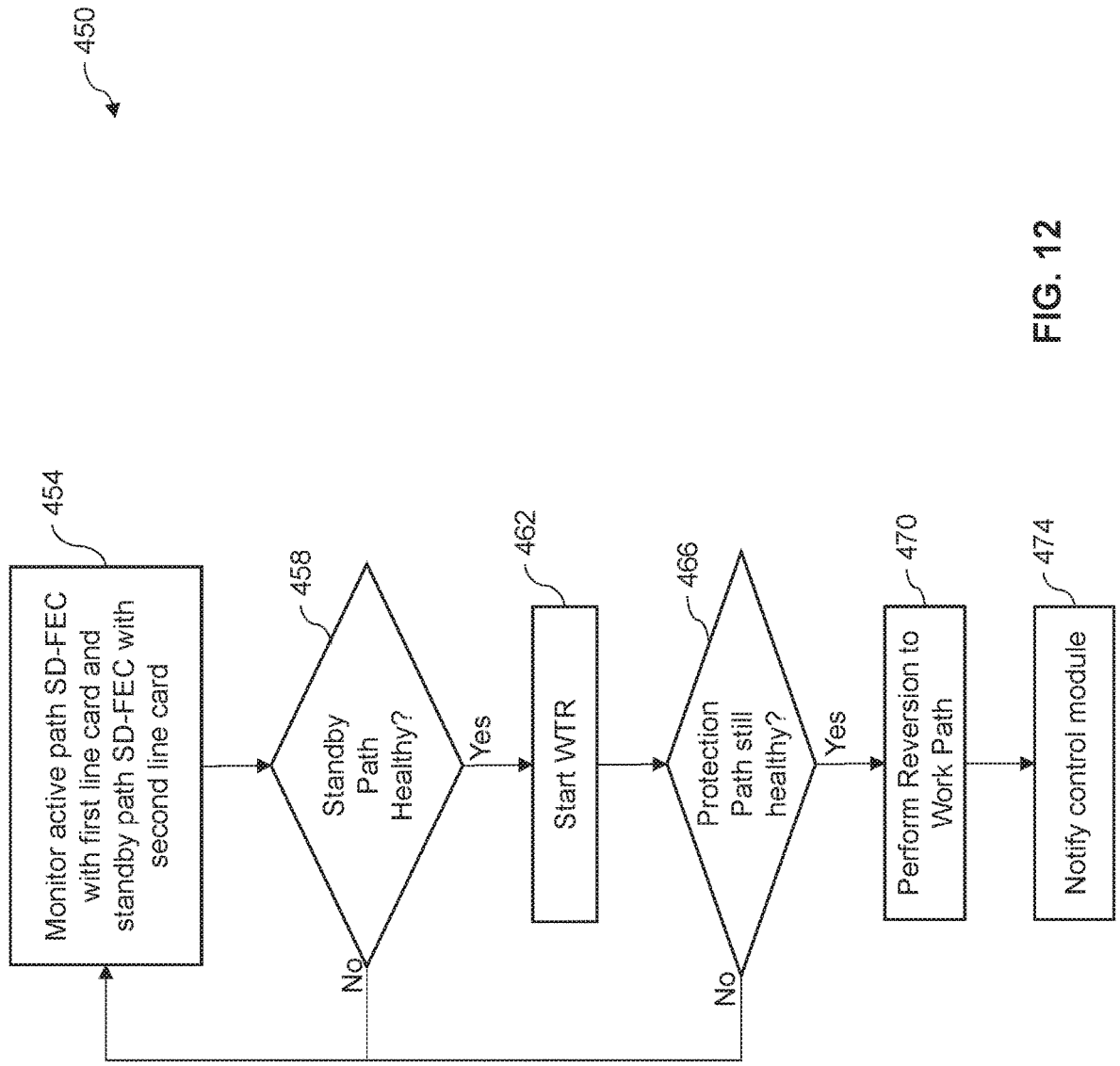
FIG. 12 is a process flow diagram of an exemplary embodiment of an OPMS reversion process in accordance with the present disclosure.

Referring now to FIG. 12, shown therein is a process flow diagram of an exemplary embodiment of an OPMS reversion process 450 in accordance with the present disclosure.

The OPMS reversion process 450 generally includes the steps: monitoring the active path SD-FEC with a first line card 50 and monitoring a standby path SD-FEC with a second line card 50 (step 454); determining if the standby path is healthy (step 458); if the standby path is healthy, start WTR (step 462) otherwise return to step 454; determine if the standby path is healthy once the WTR is complete (step 466); if the standby path is still healthy, perform reversion to working path (step 470) then notify the control module (step 474), otherwise return to step 454. In one embodiment, the OPMS reversion process 450 may start with the working path 26 being the standby path and the protection path 33 being the active path. At step 470, perform reversion to working path 26, the working path 26 is selected to be the source of the optical signal and is set as the active path and the protection path 33 is set to the standby path and is directed to the second line card 50 for monitoring. In one embodiment, at step 470, a fault signal indicative of a cleared fault is transmitted upstream. At step 474, notify the control module, the OPSM 140 notifies the control module of the newly set active path and standby path. The control module may then communicate with the management system via the management path 82. In one embodiment, the OPSM reversion process is performed by the OPSM 140, however, in another embodiment, the OPSM reversion process is controlled by the control module.

In one embodiment, during the OPMS reversion process 450, the OPSM continues to get SD-FEC status from both the first line card 50 and the second line card 50. When the working path 26 heals, the WTR is started and data traffic is reverted to the working path 26 at the end of the WTR expiry. Upon completion of the reversion to the working path 26 (step 470), the standby path is directed to the second line card for monitoring.

For each of the transmit process 300, the receive process 330, the OPSM handling process 360, the standby path monitoring process 400, and the OPMS reversion process 450, one or more of the respective steps may be combined. Further, one or more of the respective steps may be performed by a processing module and/or control module.

Referring now to FIG. 13 shown therein is a block diagram of an exemplary embodiment of a coherent transmitter portion 500 of a coherent transceiver 62. The coherent transmitter portion 500 may comprise one or more transmitter processor circuit 504 having a DSP 506, one or more laser 508, one or more modulator 512, one or more semiconductor optical amplifier 516 optically connected to the fiber optic cable 58, and/or other components (not shown). The transmitter processor circuit 504 may be located in any one or more components of the coherent transmitter portion 500, or separate from the components, and/or in any location (s) among the components. The transmitter processor circuit 504 may be in the form of one or more Application Specific Integrated Circuit (ASIC), which may contain one or more module and/or custom module. The digital data stream, including the FEC frame, is supplied to the modulator 512. The modulator 512 encodes the digital data stream, including the FEC frame into an optical signal supplied by the laser 508 to the modulator 512. The optical signal including the encoded data stream with the FEC frame is provided to the one or more semiconductor optical amplifier 516, which amplifies the optical signal and supplies the amplified optical signal to the fiber optic cable 58.

Referring now to FIG. 14, shown therein is a block diagram of an exemplary embodiment of a coherent receiver portion 550 of a coherent transceiver 62 consistent with the present disclosure. The coherent receiver portion 550 may comprise one or more local oscillator 554, a polarization and phase diversity hybrid circuit 558 receiving the optical signal via the fiber optic cable 58 and input from the local oscillator 554, one or more balanced photodiode 562 that produces the electrical signals representative of the optical signal, and one or more receiver processor circuit 566 having one or more DSP 570. Other possible components in the coherent receiver portion 550 may include filters, circuit blocks, memory, such as non-transitory memory storing processor executable instructions, additional modulators, splitters, couplers, multiplexers, etc., as is well known in the art. The components may be combined, used, or not used, in multiple combinations or orders. The DSP 570 of the receiver processor circuit 566 converts the optical signal in the optical layer in the working path 26 or the protection path 33 of the optical network 10 to a first digital data stream in a digital layer having one or more first FEC frame.

The one or more receiver processor circuit 566 and/or the one or more DSP 570 may be located on one or more component of the coherent receiver portion 550 or separately from the components, and/or in any location(s) among the components. The receiver processor circuit 566 may be in the form of an Application Specific Integrated Circuit (ASIC), which may contain one or more module and/or custom module. In one embodiment, the one or more DSP 570 may include, or be in communication with, one or more processing module 66.

From the above description, it is clear that the inventive concepts disclosed and claimed herein are well adapted to carry out the objects and to attain the advantages mentioned herein, as well as those inherent in the invention. While exemplary embodiments of the inventive concepts have been described for purposes of this disclosure, it will be understood that numerous changes may be made which will readily suggest themselves to those skilled in the art and which are accomplished within the spirit of the inventive concepts disclosed and claimed herein.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure. No element, act, or instruction used in the present application should be construed as critical or essential to the invention unless explicitly described as such outside of the preferred embodiment.

What is claimed is:

1. A regen node, comprising:
   a coherent receiver having circuitry to convert a first optical signal in an optical layer of an optical network to a first digital data stream in a digital layer having one or more first soft decision forward error correction (SD-FEC) frame and a data traffic, the first SD-FEC frame including a SD-FEC overhead portion, the SD-FEC overhead portion including operation, administration, and maintenance (OAM) information, the OAM information of the SD-FEC overhead portion including bits, the bits including: a backward defect indication, a backward signal degrade, a remote backward defect indication, and a remote backward signal degrade, wherein the first optical signal is configured to travel in a direction from an upstream node to a downstream node;
   a control module controlling the coherent receiver, the control module operable to:

extract a first fault signal based on the OAM information included in the FEC overhead portion of the first FEC frame;
generate a second fault signal based at least in part on the first fault signal; and
encode the second fault signal within a second SD-FEC frame with the data traffic into a second digital data stream on the digital layer; and
a coherent transmitter having circuitry to convert the second digital data stream into a second optical signal on the optical layer and to transmit the second optical signal to the downstream node.

2. The regen node of claim 1, wherein the coherent receiver is a first coherent receiver, the coherent transmitter is a first coherent transmitter, the data traffic is a first data traffic, and the direction is a first direction, further comprising:
a second coherent receiver having circuitry to convert a third optical signal in an optical layer in the optical network to a third digital data stream in a digital layer having one or more third SD-FEC frame and a second data traffic, wherein the third optical signal is traveling in a second direction from the downstream node to the upstream node;
the one or more control module further controlling the second coherent receiver, the control module further operable to:
extract a third fault signal from the third SD-FEC frame;
generate a fourth fault signal based at least in part on the third fault signal; and
encode the fourth fault signal within a fourth SD-FEC frame with the second data traffic into a fourth digital data stream on the digital layer; and
a second coherent transmitter having circuitry to convert the fourth digital data stream into a fourth optical signal on the optical layer and to transmit the fourth optical signal to the upstream node.

3. The regen node of claim 2, wherein the one or more control module is further operable to generate the fourth fault signal based at least in part on the third fault signal and the first fault signal.

4. The regen node of claim 2, wherein the second coherent receiver further comprises circuitry to determine a at least one of a loss of signal and a loss of frame signal of the third optical signal, and wherein the one or more control module is further operable to generate the fourth fault signal based at least in part on the third fault signal and the at least one of the loss of signal and the loss of frame.

5. The regen node of claim 4, wherein the first fault signal is a Loss of Signal, a Loss of Frame, a Pre-FEC signal defect, or an SD-FEC based Signal Fail.

6. The regen node of claim 1, wherein the coherent receiver further comprises circuitry to determine a local fault signal of the first optical signal, and wherein the one or more control module is further operable to generate the second fault signal based at least in part on the first fault signal and the local fault signal.

7. A terminal node, comprising:
a first line card;
a second line card;
an optical protection switch module operable to optically connect a first line port receiving a working optical signal or a second line port receiving a protection optical signal to a first line card as an active optical signal;
a path selector receiving the working optical signal and the protection optical signal, and having circuitry to pass the working optical signal to the second line card as a standby optical signal responsive to the protection optical signal being the active optical signal, and to pass the protection optical signal to the second line card as the standby optical signal responsive to the working optical signal being the active optical signal,
wherein the first line card comprises a coherent receiver having circuitry to convert the active optical signal in an optical layer to an active digital data stream in a digital layer having one or more active soft decision forward error correction (SD-FEC) frame and an active data traffic, the active SD-FEC frame including an SD-FEC overhead portion, the SD-FEC overhead portion including operation, administration, and maintenance (OAM) information, the OAM information of the SD-FEC overhead portion including bits, the bits including: a backward defect indication, a backward signal degrade, a remote backward defect indication, and a remote backward signal degrade, and wherein the second line card comprises a coherent receiver having circuitry to convert the standby optical signal in an optical layer to a standby digital data stream in a digital layer having one or more standby SD-FEC frame and a standby data traffic; and wherein the terminal node further comprises:
a control module controlling the first line card and the second line card, the control module operable to:
extract a first fault signal based on the OAM information included in the SD-FEC overhead portion of the active SD-FEC frame and extract a second fault signal from the standby SD-FEC frame.

8. The terminal node of claim 7, wherein the control module has circuitry operable to:
determine if the first fault signal indicates a fault on an active path, and if the first fault signal indicates a fault on the active path, send a switch signal to the path selector and cause the optical protection switch module to optically connect the second line port to the first line card.

9. The terminal node of claim 7, wherein the one or more control module is further operable to:
determine if the first fault signal indicates a first fault on an active path;
determine if the second fault signal indicates a second fault on a standby path; and
if the first fault signal indicates the first fault and the second fault signal indicates the second fault, send the switch signal to the path selector and cause the optical protection switch module to optically connect the second line port to the first line card.

10. The terminal node of claim 7, wherein the control module is further operable to:
determine if the first fault signal or the second fault signal indicates a cleared fault, and, if a cleared fault is indicated, send the switch signal to the path selector thereby passing the protection optical signal as the standby optical signal and cause the optical protection switch module to optically connect the first line port to the first line card thereby causing the working optical signal to be the active optical signal.

11. The method claim 10, wherein receiving, by the coherent receiver, includes receiving a first optical signal having more than one channel from the first fiber optic cable.

12. A method, comprising:
receiving, by a coherent receiver of a regen, a first optical signal from a first fiber optic cable;

converting, by the coherent receiver, the first optical signal into a first digital data stream having a digital data and a first soft decision forward error correction (SD-FEC) frame, the first SD-FEC frame including an SD-FEC overhead portion, the SD-FEC overhead portion including operation, administration, and maintenance (OAM) information, the OAM information of the SD-FEC overhead portion including bits, the bits including: a backward defect indication, a backward signal degrade, a remote backward defect indication, and a remote backward signal degrade;

extracting, by a control module, a first fault signal based on the OAM information included in the SD-FEC overhead portion of the first SD-FEC frame of the first digital data stream;

encoding, by the control module, a second SD-FEC frame and the digital data into a second digital data stream, the second SD-FEC frame based at least in part on the first fault signal;

converting, by a coherent transmitter, the second digital data stream into a second optical signal; and transmitting, by the coherent transceiver, the second optical signal on a second fiber optic cable.

13. The method of claim 12 further comprising: determining, by the coherent receiver, a local fault signal of the first optical signal.

14. The method of claim 13, wherein encoding, by the control module, is encoding a second SD-FEC frame and the digital data into a second digital data stream, the second FEC frame based at least in part on the first fault signal and the local fault signal.

15. The method claim 12, wherein receiving, by the coherent receiver, is receiving a first optical signal having one channel from the first fiber optic cable.

* * * * *